(12) United States Patent
Williams et al.

(10) Patent No.: US 7,290,479 B2
(45) Date of Patent: Nov. 6, 2007

(54) STOP FOR A SLIDE ASSEMBLY

(75) Inventors: Matthew R. Williams, Fort Wayne, IN (US); Cale M. Reese, Fort Wayne, IN (US); Clyde W. Sprowl, Huntington, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 11/593,367

(22) Filed: Nov. 6, 2006

(65) Prior Publication Data

US 2007/0079699 A1    Apr. 12, 2007

Related U.S. Application Data

(63) Continuation-in-part of application No. 11/340,121, filed on Jan. 26, 2006.

(60) Provisional application No. 60/648,010, filed on Jan. 28, 2005.

(51) Int. Cl.
*F15B 15/24* (2006.01)
*F15B 15/00* (2006.01)

(52) U.S. Cl. ............................................. 92/88; 92/15

(58) Field of Classification Search ............... 92/15, 92/18, 27, 28, 88
See application file for complete search history.

(56) References Cited

U.S. PATENT DOCUMENTS 5,335,583 A * 8/1994 Kaneko et al. ................. 92/88
5,568,982 A * 10/1996 Stoll et al. ...................... 92/88
5,606,903 A * 3/1997 Drittel ............................ 92/88
5,950,790 A * 9/1999 Barber ........................... 92/88
6,196,110 B1 * 3/2001 Angue ........................... 92/88
6,874,407 B2 * 4/2005 Doleschel et al. ............. 92/88

FOREIGN PATENT DOCUMENTS

| JP | 11117910 A | * | 4/1999 |
| JP | 11351256 A | * | 12/1999 |

* cited by examiner

*Primary Examiner*—Thomas E. Lazo
(74) *Attorney, Agent, or Firm*—Barnes & Thornburg LLP

(57) ABSTRACT

A rodless slide assembly is provided illustratively having a longitudinally-extending cylinder, a carriage, a stop assembly, and a catch assembly. The longitudinally-extending cylinder includes first and second ends and a path of travel extending therebetween. The carriage is slidable on the path of travel on the cylinder between the first and second ends. The stop assembly includes a stop block and a stabilizer. The stop assembly is coupled to the carriage and the stabilizer is located between the stop block and the carriage. The catch assembly comprises a catch bar and an actuator assembly. The catch bar is located adjacent the path of travel of the carriage.

13 Claims, 31 Drawing Sheets

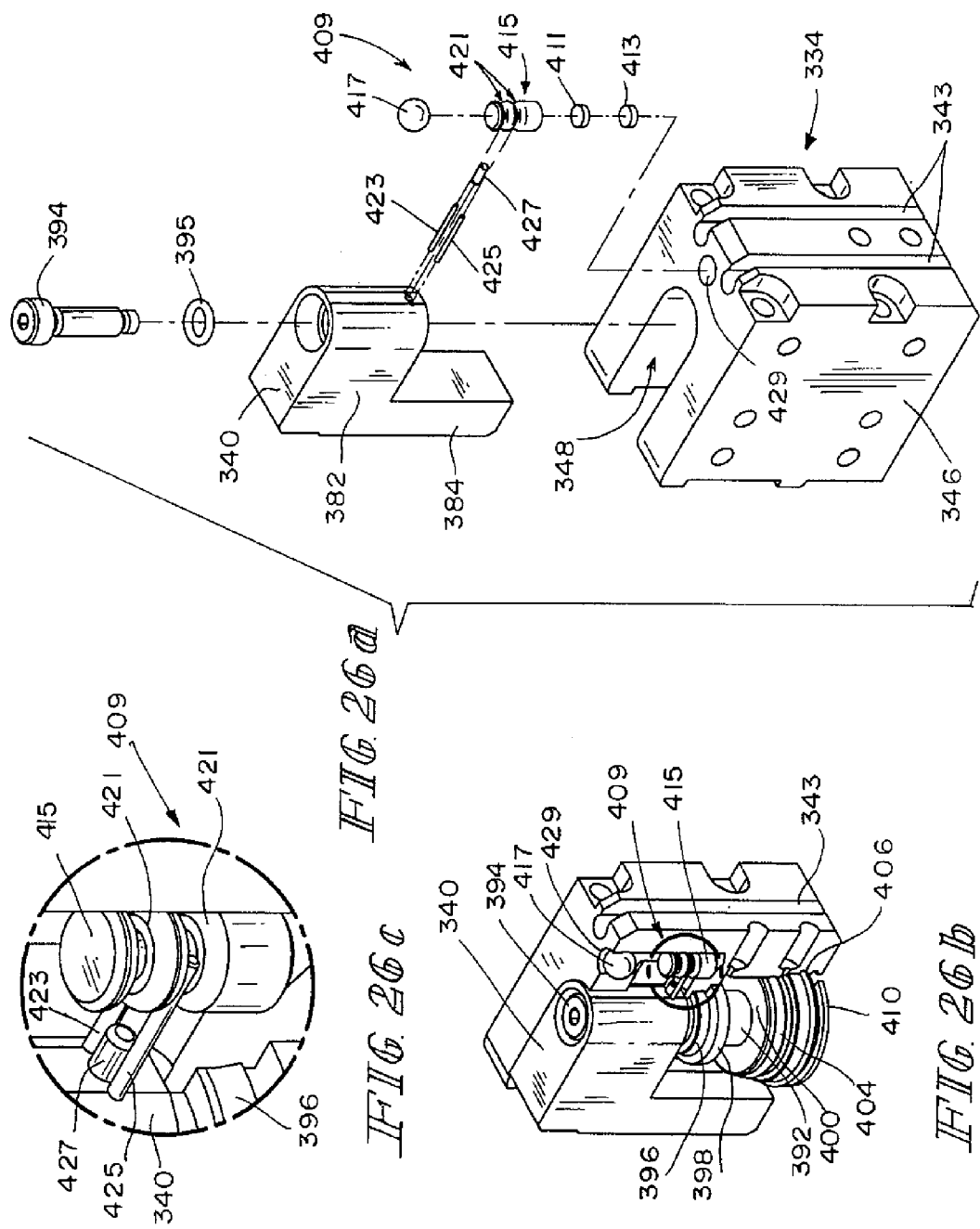

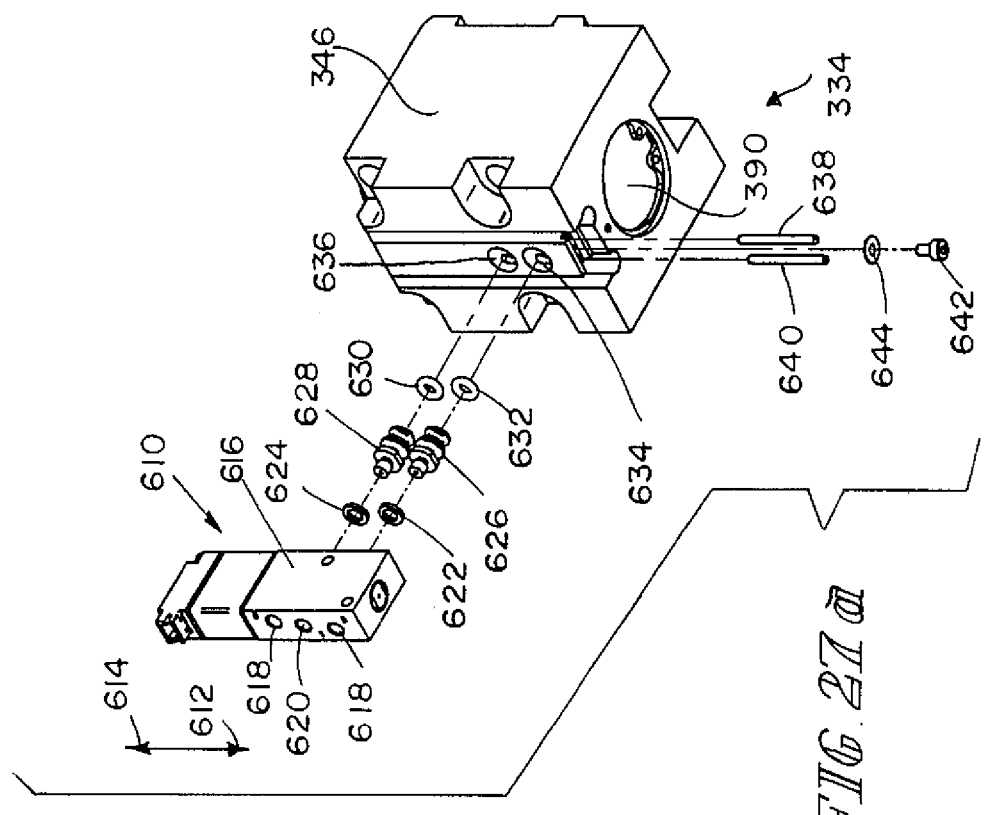
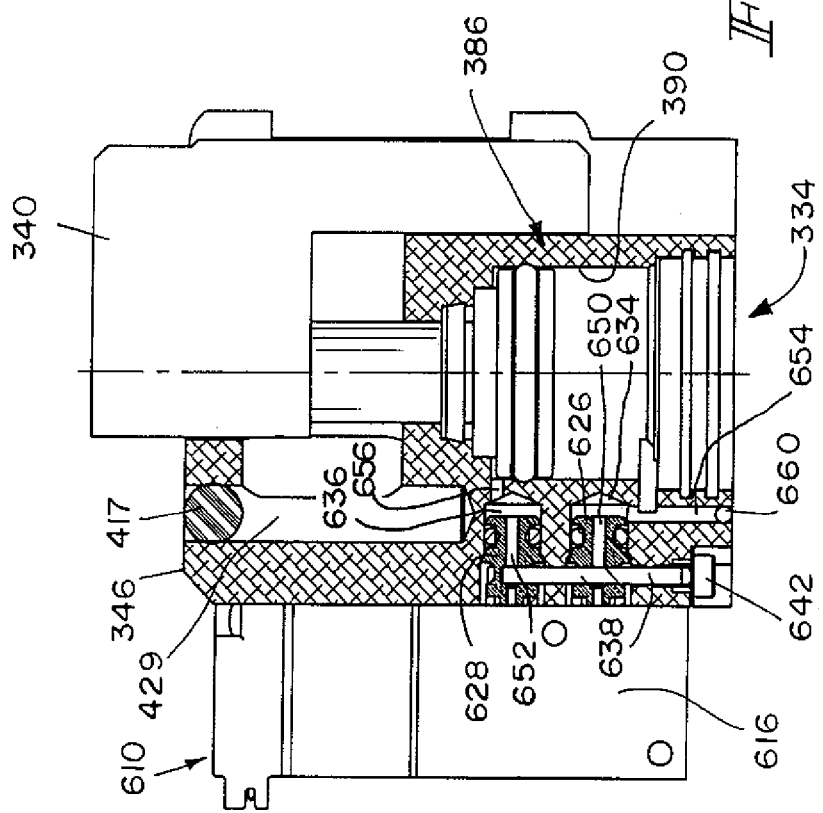
FIG. 27a
FIG. 27b

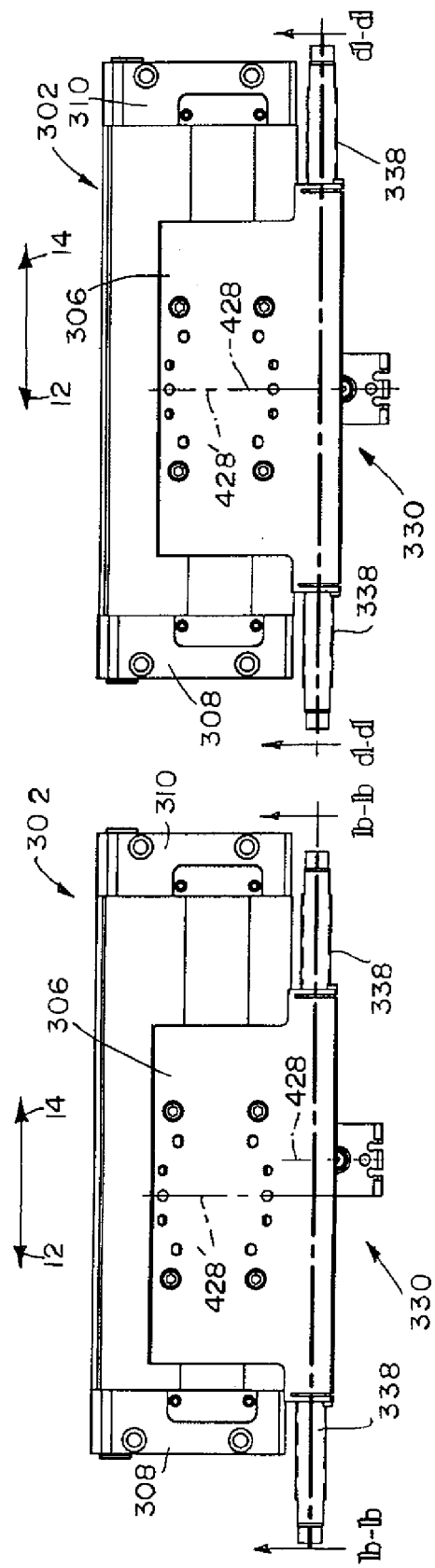
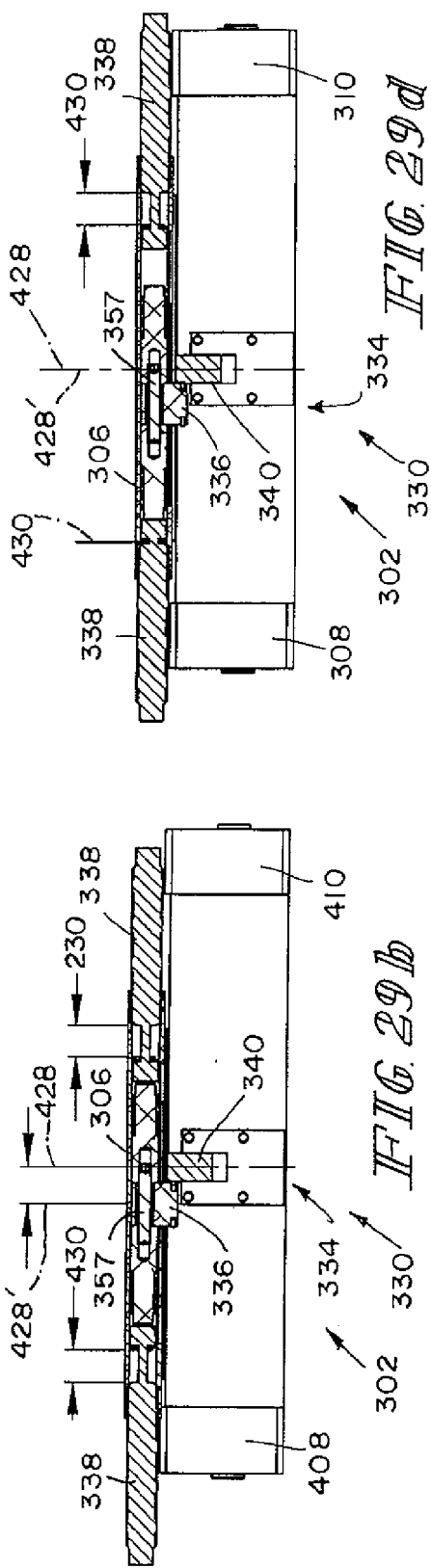
FIG. 29c
FIG. 29d
FIG. 29a
FIG. 29b

STOP FOR A SLIDE ASSEMBLY

RELATED APPLICATIONS

The present application is a continuation-in-part application of U.S. Utility patent application Ser. No. 11/340,121, filed on Jan. 26, 2006, entitled "Stop for a Slide Assembly," which claims priority to U.S. Provisional Patent Application Ser. No. 60/648,010, filed on Jan. 28, 2005, entitled "Stop for a Slide Assembly." The subject matter disclosed in those applications is hereby expressly incorporated into the present application.

TECHNICAL FIELD

The present disclosure relates to accessories for rodless slide assemblies and, more particularly, to rodless slide assemblies having a stop mechanism or mechanisms attached thereto.

BACKGROUND AND SUMMARY

Rodless slide assemblies are common devices that move a tool or workpiece mounting from one position to another. Typically, such rodless slide assemblies are used on manufacturing lines to assist in the manufacture of a product. A common rodless slide assembly includes an elongated cylinder body having an axially-extending chamber or slot disposed therein and a piston assembly located within the slot. The piston assembly moves reciprocally within the slot under fluid pressure. Such an assembly is considered "rodless" because rather than including a piston rod attached to a piston, it is attached to a motion-transmitting element which extends through the slot. This element is coupled to a carriage or saddle located exterior of the cylinder and moves concurrently therewith. The carriage is typically configured to receive a workpiece support tool, machine tool, etc. for use on the manufacturing line.

The axially-extending slot is typically sealed by means of a sealing strip or band located over the opening of the slot. The band is pressed against the periphery of the axially-extending slot often by either fastening or by internal fluid pressures. Generally, the sealing strip or band is pulled away from the axially-extending slot at about the center of the piston assembly whereabout the motion-transmitting element extends through the slot.

The cylinder that houses the piston, as well as provides the pathway along which the piston travels, can be made to any variety of lengths to accommodate a desired distance of travel. Typically, the piston and/or carriage moves the entire length of the cylinder. Typically the cylinder is capped at each end which receives the piston and/or carriage at the end of its stroke. It would be beneficial, however, to provide a rodless slide assembly having a carriage that can be stopped at an intermediate position, short of the end of the stroke typically defined by the length of the cylinder. The carriage may be stopped at one or a plurality of intermediate locations along the length of the stroke.

Accordingly, an illustrative embodiment of the present disclosure provides a rodless slide assembly comprising a longitudinally-extending cylinder, a carriage, a stop assembly, and a catch. The longitudinally-extending cylinder comprises first and second ends and a path of travel extending therebetween. The carriage is slidable on the path of travel on the cylinder between the first and second ends. The stop assembly comprises a stop block and a stabilizer. The stop assembly is coupled to the carriage and the stabilizer is located between the stop block and the carriage. The catch assembly comprises a catch bar and an actuator assembly. The catch bar is located adjacent the path of travel of the carriage.

In the above and other illustrative embodiments, the rodless slide assembly may further comprise: the actuator assembly selectively moving the catch bar to engage the stop block and stop the carriage when the carriage is positioned at a selected location on the path of travel; the carriage further comprising an underside and the stop block being located on the underside; the catch bar further comprising a support portion being spaced apart from the actuator assembly and does not impact the stop block, and being configured to absorb at least a portion of any impact force created during engagement between the catch bar and the stop block; the stop block being movable with respect to the carriage; the stop block being engagable with at least one shock absorber; further comprising a plate located between the stop block and the carriage, wherein the stabilizer further comprising at least one bias located between the plate and the stop block; the bias comprising at least one spring and bearing, wherein the bearing engages the plate; the catch bar being L-shaped; the catch bar being coupled to the actuator assembly via a fastener; the catch assembly further comprising an o-ring disposed between the fastener and the catch bar to provide stabilization of the catch bar.

Another illustrative embodiment of the present disclosure provides a rodless slide assembly comprising a longitudinally-extending cylinder, a carriage, a stop assembly, and a catch assembly. The longitudinally-extending cylinder comprises first and second ends and a path of travel extending therebetween. The carriage is slidable on the path of travel on the cylinder between the first and second ends. The stop assembly comprises a stop block and is coupled to the carriage. The catch assembly comprises an impact bar and a block. The impact bar is coupled to the block by at least one dowel pin that engages both the impact bar and the block.

In the above and other illustrative embodiments, the rodless slide assembly may further comprise an impact bar that is adjustable relative to the block by a screw that engages both.

Additional features and advantages of the rodless slide assembly will become apparent to those skilled in the art upon consideration of the following detailed description of the illustrated embodiment exemplifying the best mode of carrying out the rodless assembly as presently perceived.

BRIEF DESCRIPTION OF DRAWINGS

The present disclosure will be described hereafter with reference to the attached drawings, which are given as non-limiting examples only in which:

FIGS. 26a through c are exploded, sectional, and detailed perspective views of an illustrative embodiment of a catch assembly;

FIGS. 27a and b are perspective and cross-sectional views of the catch assembly of FIGS. 24-26 with a valve assembly attached thereto.

FIGS. 29a-d are top-plan and front cross-sectional views of an illustrative rodless slide assembly including the carriage and stop assemblies of FIGS. 20-23;

Figure 1:
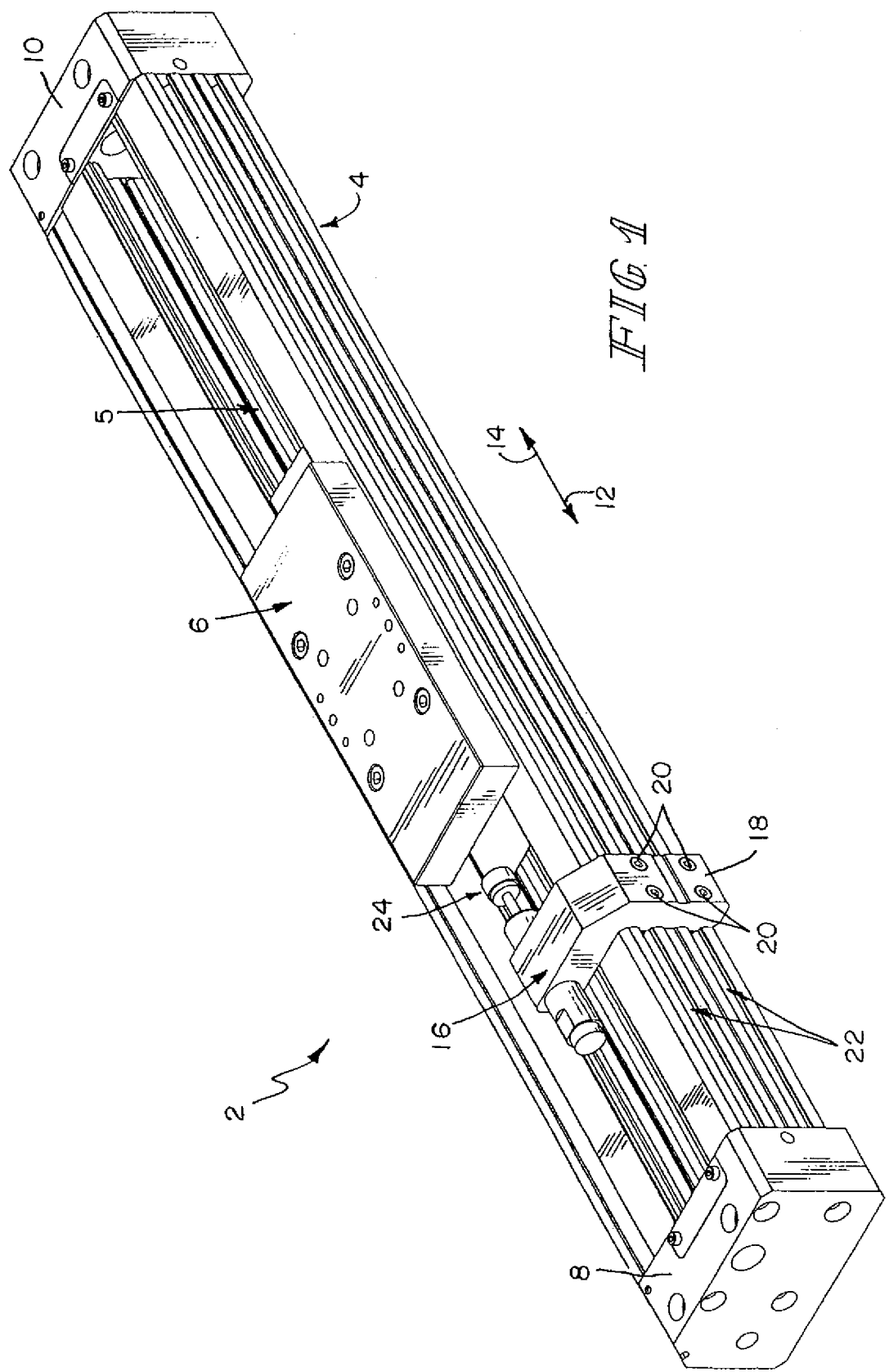
FIG. 1 is a perspective view of an illustrative rodless slide assembly including one illustrative embodiment of a stop assembly.

Corresponding reference characters indicate corresponding parts throughout the several views. The exemplification set out herein illustrates various embodiments of the rodless slide assembly, and such exemplification is not to be construed as limiting the scope of the rodless slide assembly in any manner.

DETAILED DESCRIPTION OF THE DRAWINGS

A perspective view of an illustrative rodless slide assembly 2 is shown in FIG. 1. The slide assembly comprises a cylinder 4 having a piston (not shown) located within slot 5. As known to those skilled in the art, the piston is typically coupled to a carriage 6 moving the same along the length of the cylinder. End caps 8 and 10 are located at the ends of cylinder 4 defining the stroke of carriage 6 which extends in directions 12 and 14. It is appreciated that the rodless slide assembly 2 shown herein is illustrative and it is contemplated that rodless slide assemblies of other configurations, including but not limited to dual chamber rodless slide assemblies, can be used for the purposes disclosed herein.

Figure 2:
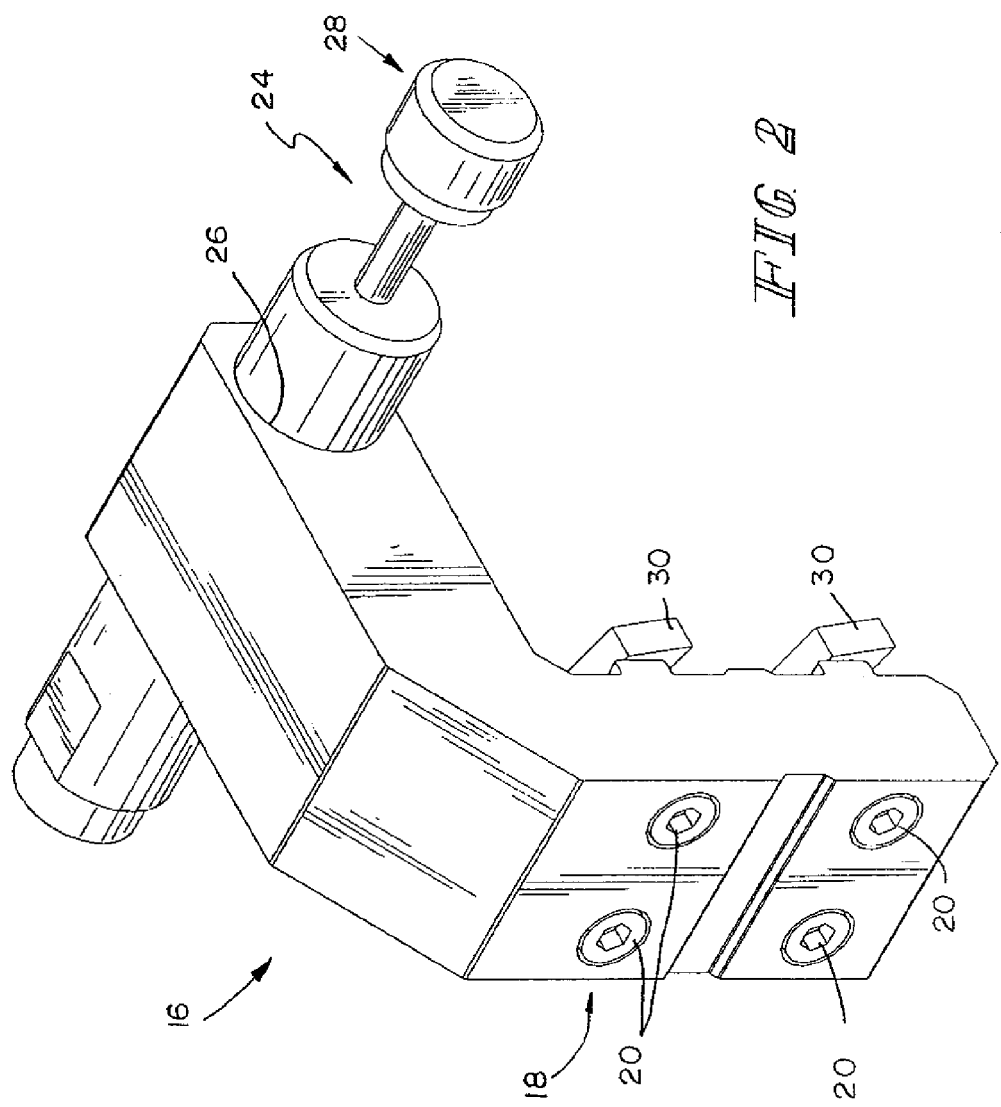
FIG. 2 is a perspective view of the stop assembly of FIG. 1.

A first embodiment of a stop assembly 16 is depicted in FIGS. 1 and 2. In the illustrated embodiment of FIG. 1, stop assembly 16 comprises a bracket 18 that is attachable to a portion of cylinder body 4 via fasteners 20. Illustratively, portions of bracket 18 can be disposed in slots 22 extending along the periphery of cylinder 4 to allow stop assembly 16 to be positioned anywhere along the length of the stroke. It is contemplated that stop assembly 16 can be adjustable so carriage 6 can engage shock absorbing assembly 24 and stop at any desired position along the stroke. It is further contemplated that multiple stop assemblies 16 can be positioned on rodless slide assembly 2 to limit movement of carriage 6.

The perspective view of stop assembly 16 is shown in FIG. 2. Bracket 18 is illustratively shaped to attach to the side of cylinder 4, as well as engage carriage 6. Bracket 18 can be illustratively fabricated from an aluminum extrusion having the appropriate geometry, or fabricated from aluminum stock, for example. Shock absorbing assembly 24 is illustratively an externally-threaded hydraulic shock absorber located within a threaded hole 26 passing through bracket 18. A shock pad 28 extends from assembly 24 and is configured to receive the impact from carriage 6. Bracket 18 is illustratively positioned near the location where carriage 6 is to be stopped. Bracket 18 is retained on the cylinder assembly via threaded fasteners 20 that engage T-nuts 30 which are received in slots 22. (See FIG. 1.) In one illustrative embodiment, precise adjustment of the stopping position for carriage 6 can be made by rotating shock absorbing assembly 24 back and forth within hole 26 (which is complimentarily threaded) to the desired position. It is further appreciated that in alternate embodiments other fastening attachments can be used on assembly 24 to selectively attach it to carriage 6.

Figure 3:
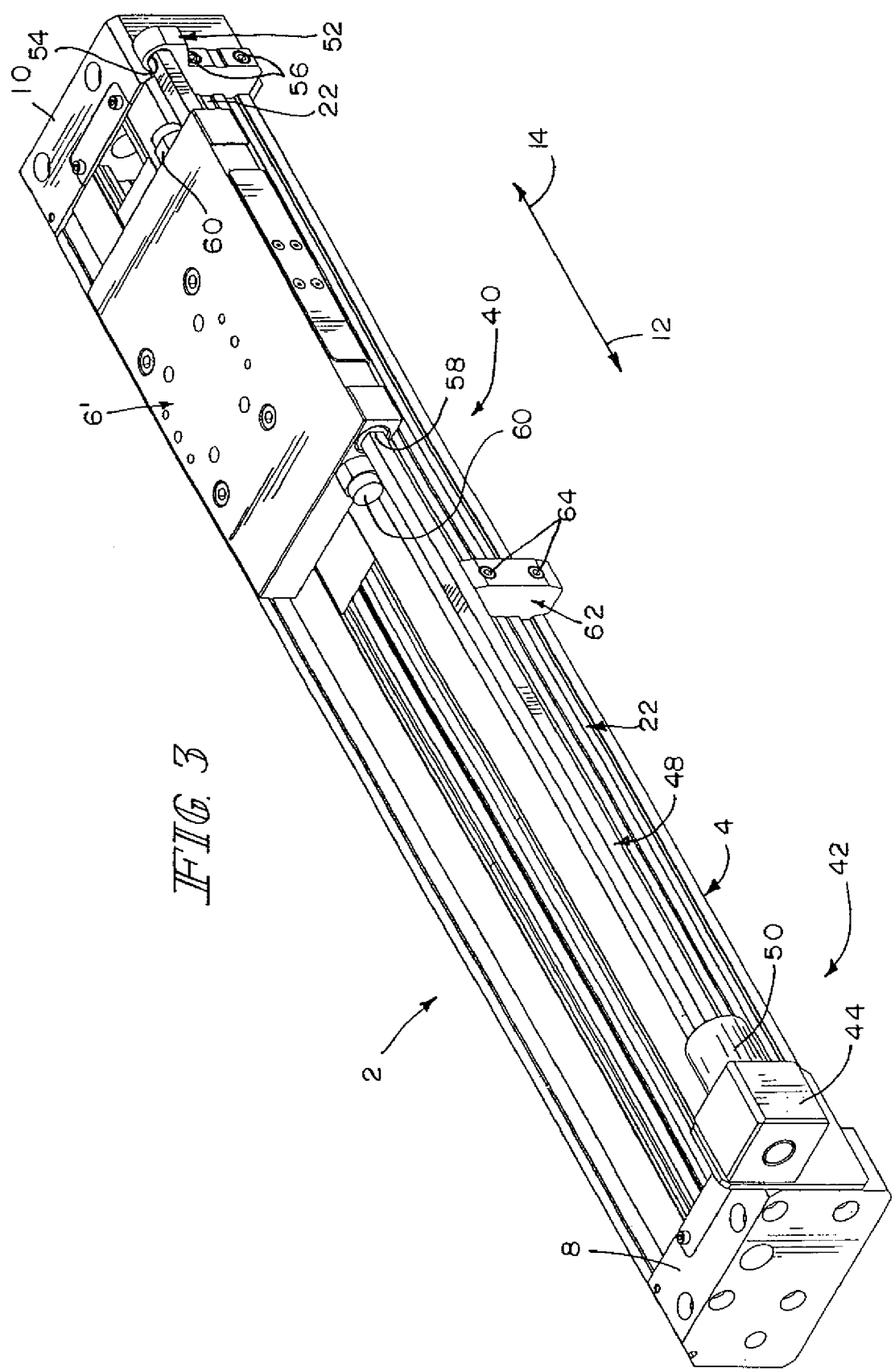
FIG. 3 is a perspective view of an illustrative rodless slide assembly including another illustrative embodiment of a stop assembly.
Figure 4:
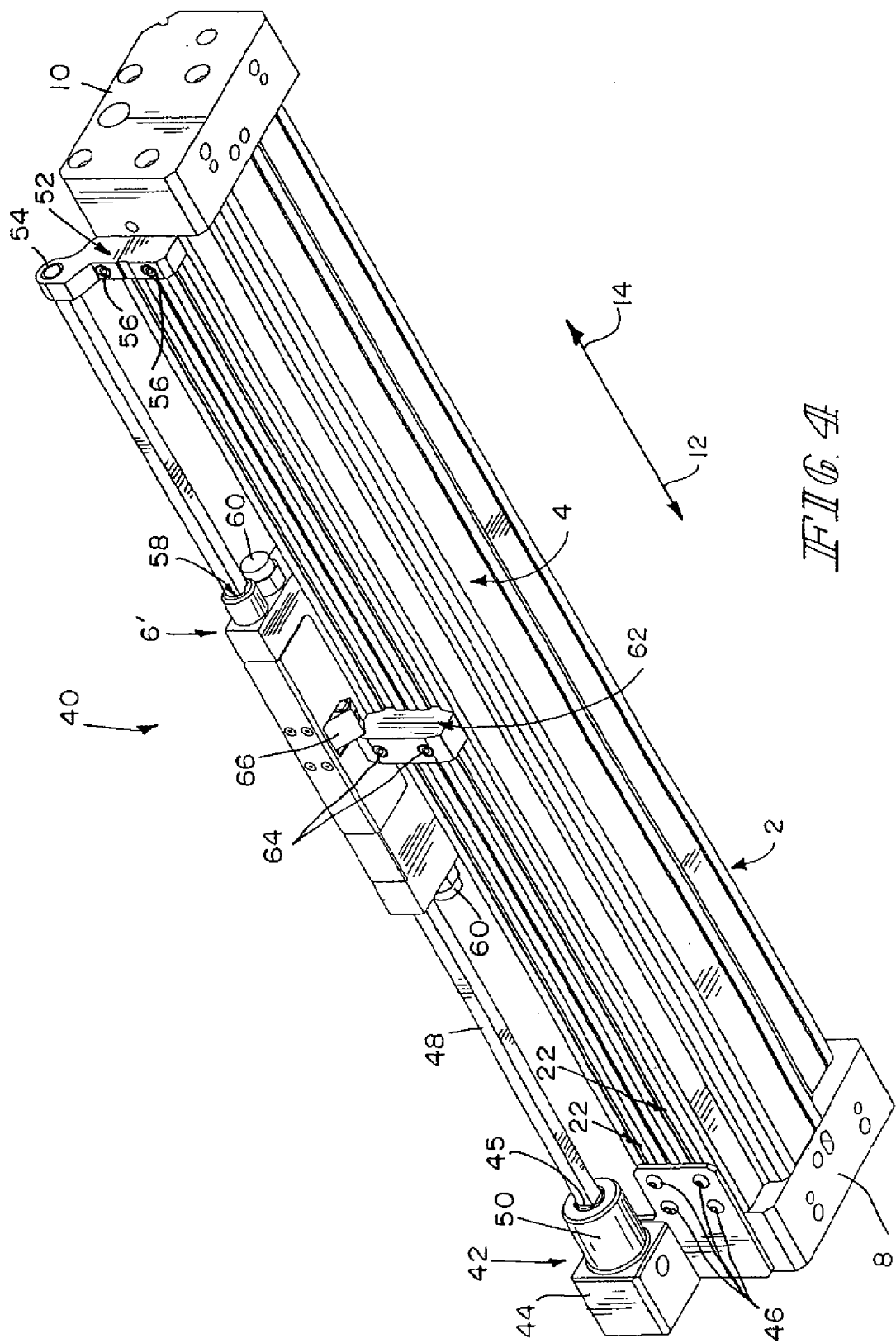
FIG. 4 is an underside-perspective view of the rodless slide assembly of FIG. 3, showing operation of the stop assembly.
Figure 5:
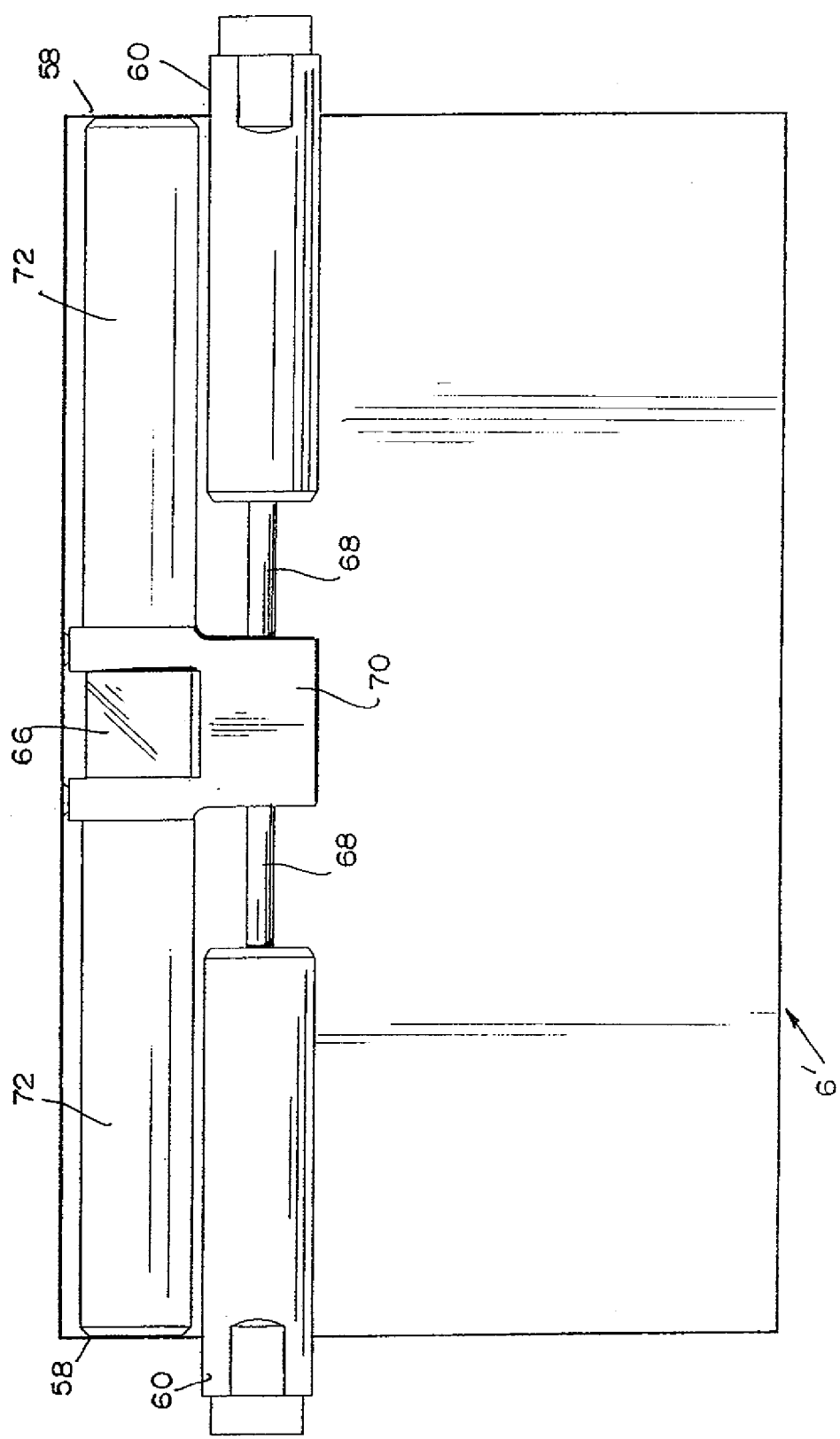
FIG. 5 is an underside view of the carriage portion of the rodless slide assembly of FIGS. 3 and 4 showing the internal structures of a portion of the stop assembly.
Figure 6:
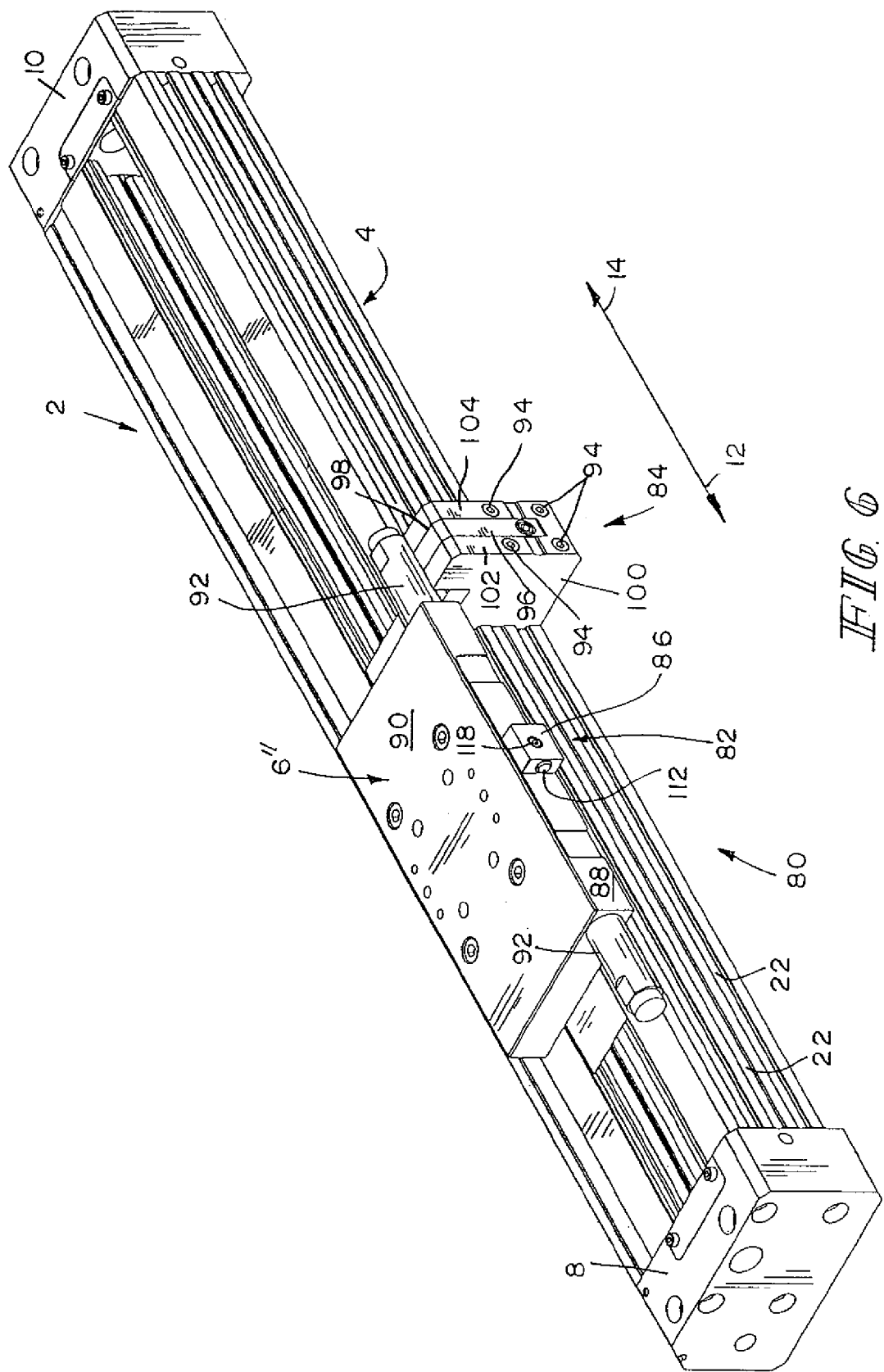
FIG. 6 is a perspective view of another illustrative rodless slide assembly including another illustrative embodiment of a stop assembly.

Another illustrative embodiment of a stop assembly 40 is shown in FIGS. 3-5. This embodiment allows selective control over whether the carriage will or will not stop at a predefined intermediate location or locations along the stroke of carriage 6'. A perspective view of illustrative rodless slide assembly 2 with stop assembly 40 coupled thereto is shown in FIG. 3. For illustrative purposes, slide assembly 2 is similar to slide assembly 2 shown in the previous embodiment, including cylinder 4 and caps 8 and 10. In addition, carriage 6' is movable in directions 12 and 14, similar to the prior embodiment. In this embodiment, however, an illustrative pneumatic rotary actuator assembly 42 is attached to assembly 2. Assembly 42 comprises an actuator 44 which can be a pneumatic rotary actuator or an electrically-driven rotary solenoid, for example, that can be positioned at a distal end of slide assembly 2. Actuator 44 can be retained on one side of cylinder 4 via fasteners 46 and T-nuts (not shown) that engage slots 22 similar to that described with respect to stop assembly 16 of the prior embodiment. (See, also, FIG. 4.) Illustratively, a bar 48 is disposed within a mating cavity 45 of rotating output shaft 50 of actuator 44 and extends about the length of travel of carriage 6'. (See FIG. 4.) In one embodiment, shaft 50 can be a fixed component of actuator 44. Additionally, it is appreciated that in one embodiment the rotation of bar 48 can take place internally to shaft 50. Bar 48 illustratively shown has a square cross-section. It is appreciated, however, that in other embodiments bar 48 may have other cross-sections suitable for the purposes further described herein. A bracket 52 is attached to slots 22 of body 4 opposite actuator 44. Bracket 52 has a bore 54 configured to receive the end of bar 48 opposite actuator 44. Bore 54 is illustratively configured to allow bar 48 to rotate unimpeded. As shown in FIG. 3, fasteners 56, in conjunction with T-nuts (not shown), engage slot 22 of cylinder 4 to lock bracket 52 into place.

In this embodiment, carriage 6' comprises a bore 58 disposed therethrough to receive bar 48. In addition, externally threaded shock absorbers 60 extend into carriage 6'. A stop block 62 attaches to slots 22 of cylinder 4 via fasteners 64 and T-nuts (not shown) in a manner similar to that described with respect to other embodiments.

The underside perspective view of slide assembly 2 in FIG. 4 depicts the operation of stop assembly 40. In this illustrative embodiment, saddle 6' is typically free to slide along the stroke of assembly 2 in directions 12 and 14 unencumbered. If it is desired that carriage 6' stop at an intermediate position along the stroke, particularly at stop block 62, a contact bar 66 is selectively activated to an engagable position to impact stop block 62 as shown. To accomplish this, actuator 44 is activated to rotate bar 48. That rotation causes at least a portion of contact bar 66 to extend from carriage 6' and strike stop block 62. It is appreciated that the rotation of bar 48 does not interfere with the linear movement of carriage 6' in directions 12 and 14. As shown in FIG. 4, carriage 6' was moved in direction 12 and contact bar 66 actuated to extend therefrom which stops carriage 6' at that location. When it is desired that carriage 6' continue moving in direction 12, actuator 44 again rotates bar 48, but now to retract bar 48 sufficient to remove contact bar 66 as an obstruction to stop block 62 allowing carriage 6' to pass. It is appreciated that bar 66 can be retracted fully into carriage 6' or retracted only enough to clear stop block 62. It is further appreciated that an alternate embodiment may include plurality of stop blocks attached to assembly 2 to facilitate a corresponding plurality of intermediate stopping positions for carriage 6'.

The underside view of carriage 6' shown in FIG. 5, further illustrates the mechanism that controls contact bar 66. As shown therein, two externally-threaded shock absorbers 60 with the input piston rods 68 opposing each other engage yoke 70. Bar 48 is illustratively disposed through yoke 70 and sliding members 72 and contact bar 66. Sliding members 72 may comprise a cross-sectional opening of square or other sufficient cross-sectional profile and dimension to receive bar 48. The outer surface of sliding members 72 may have a bearing surface that allows the same to rotate within bore 58 of carriage 6'. Actuation of actuator 44 causes bar 48, and thus, sliding member 72 to rotate along with contact bar 66.

Prior to contact with stop block 62, actuator 44 rotates bar 48 which rotates contact bar 66 into the impact position. Once contact bar 66 strikes stop block 62, a shock absorber assembly compresses to provide a controlled deceleration of contact bar 66, yoke 70, and sliding member 72. Continued movement of carriage 6' compresses the other shock absorber assembly 60 in a direction opposite the direction of travel by carriage 6' until the kinetic energy of carriage 6' and any attached loads are dissipated therethrough and carriage 6' is brought to rest. When contact bar 66 is then rotated away from stop block 62, by actuation of the actuator 44 and bar 48, carriage 6' is free to continue moving. It is appreciated that the dimension of the contact bar and stop block in the direction of travel of carriage 6' is illustratively chosen in conjunction with the stroke of the shock absorbers 60. This choice of dimension may provide the stop with the ability to position the centerline of the carriage 6' coincident with the centerline of the contact bar 66, regardless of which direction carriage 6' is traveling, as discussed further herein in conjunction with additional embodiments.

Another illustrative embodiment of a rodless slide assembly 2, incorporating another illustrative embodiment of a stop assembly 80, is shown in FIGS. 6-9. This illustrative embodiment comprises a stop block assembly 82 and a catch assembly 84. Stop block assembly 82 is located in carriage 6" and comprises a stop block 86 positioned outwardly from the side 88 of carriage 6". In the illustrated embodiment, side 88 is positioned essentially perpendicular to top surface 90 of carriage 6". Shock absorbers 92 are disposed in carriage 6" on each side of stop block 86.

Catch assembly 84 is configured to be positioned at a location about where carriage 6" is desired to be stopped. (See, also, FIG. 7.) Illustratively, assembly 84 is retained onto cylinder 4 via fasteners 94 and T-nuts (not shown) disposed in slots 22, similar to that described in previous embodiments. A catch bar 96 is disposed within a slot 98 of block 100. In this illustrative embodiment catch bar 96 is movable transverse to the directional movement of carriage 6". Block portions 102 and 104 prevent movement of catch bar 96 in directions 12 and 14. A pneumatically-driven piston or electrically-driven solenoid, or other suitable actuator used in conjunction with block 100, moves catch bar 96 towards stop block 86 preventing carriage 6" from moving there passed. The portions 102 and 104 buttress catch bar 96 by receiving and dissipating at least a portion of the impact force. It is appreciated that catch bar 96 can be retracted so that carriage 6" can move along the stroke of slide assembly 2 in directions 12 and 14 unencumbered by catch bar 96.

Figure 7:
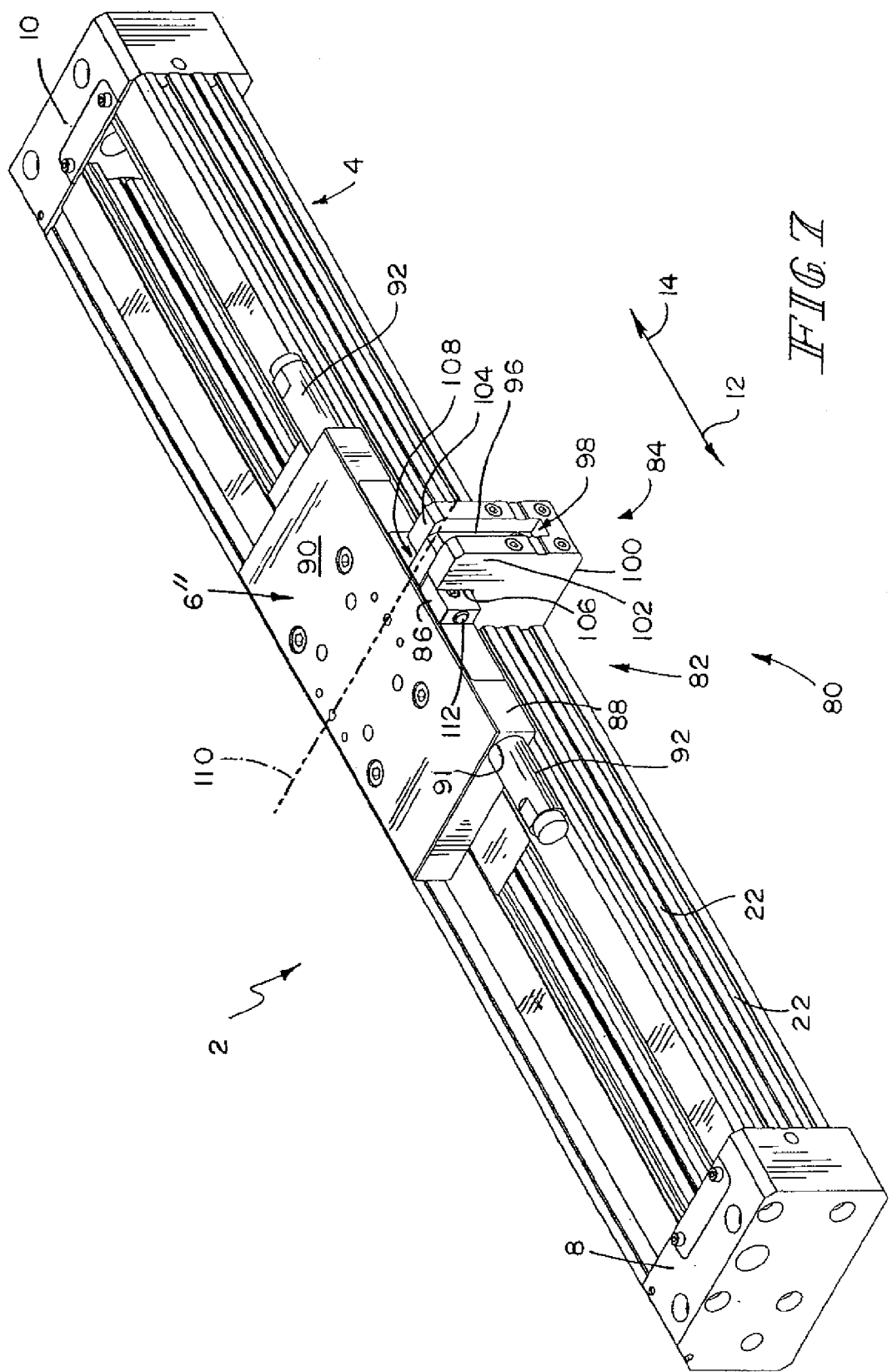
FIG. 7 is another perspective view of the rodless slide assembly of FIG. 6 showing operation of the stop assembly.

The perspective view of FIG. 7 depicts the impact between stop block 86 and catch bar 96 to stop carriage 6". Catch bar 96 is moved into an engaging position. Cutouts 106 and 108 formed in portions 102 and 104, respectively, provide clearance for stop block 86. In this illustrative embodiment, the positioning of stop block 86 along with the tension and stroke distances of shock absorber assemblies 92, assist in stopping carriage 6" along centerline 110 which is also the centerline of catch bar 96 as illustratively shown therein. Stop block 86 also illustratively comprises shock pads 112. Each pad 112 is located on a strike surface of stop block 86.

Figure 8:
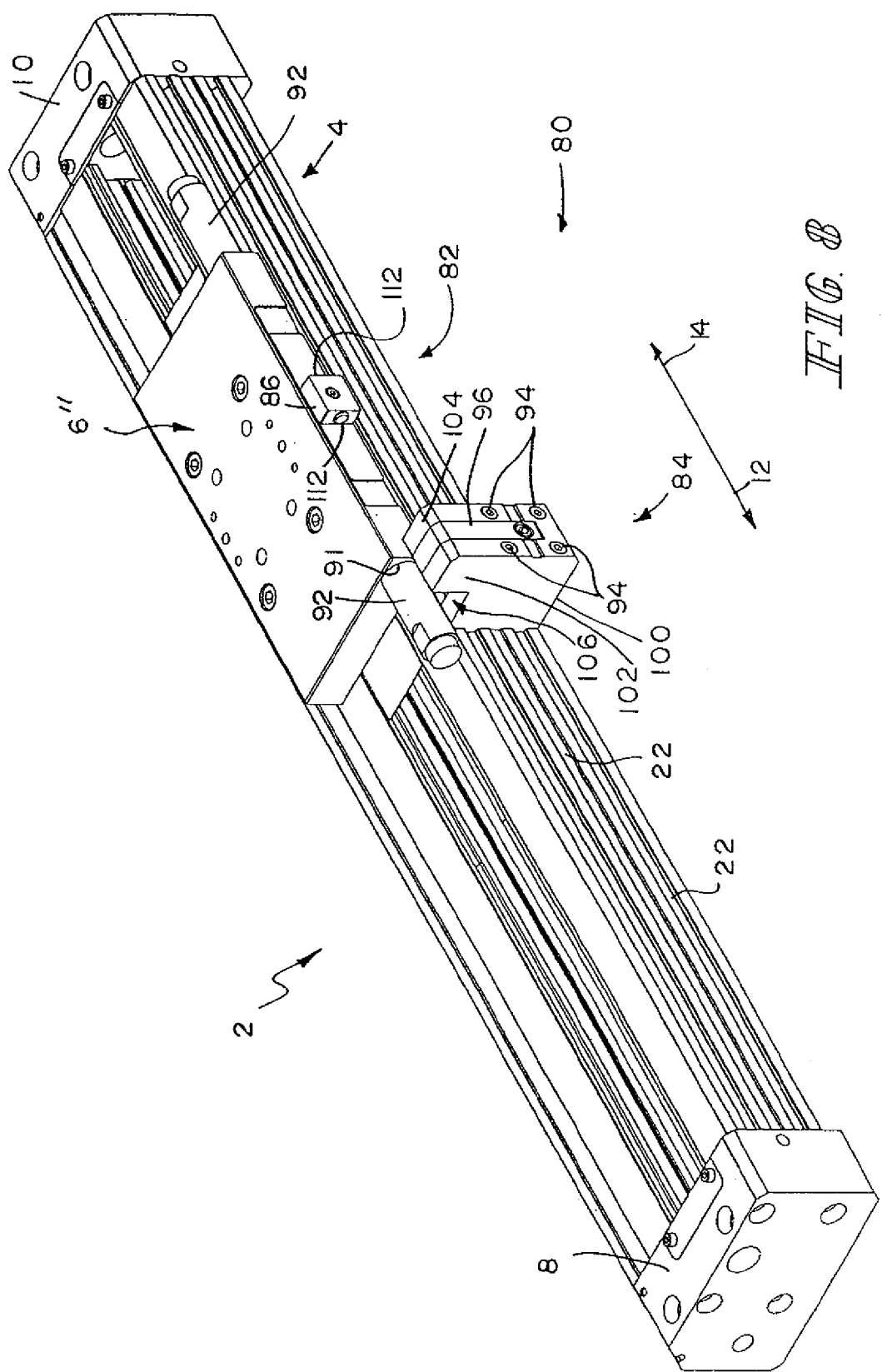
FIG. 8 is another perspective view of the slide assembly of FIGS. 6 and 7, showing the operation of the illustrative stop assembly.

Another view of slide assembly 2 is shown in FIG. 8. In this view, catch bar 96 has been retracted again, allowing carriage 6" to continue moving in direction 14. It is appreciated that the views in FIGS. 6-8 demonstrate a progression of motion of carriage 6" from a starting position and moving in direction 14 in FIG. 6, to catch bar 96 blocking stop block 86 to stop carriage 6" in FIG. 7, to releasing carriage 6" and continuing in direction 14 in FIG. 8 to complete the stroke. It is appreciated that this operation works in the same manner when carriage 6" is moving in the opposite direction 12. For instance, in this embodiment, stop block 86 will strike catch bar 96 again and portion 102 will serve to assist absorbing at least a portion of the impact force. In addition, it is contemplated that catch assembly 84 can be moved to any location along the length of cylinder 4. Also, a plurality of catch assemblies 84 can be fastened to cylinder 4 to stop carriage 6" at any plurality of intermediate locations.

Figure 9:
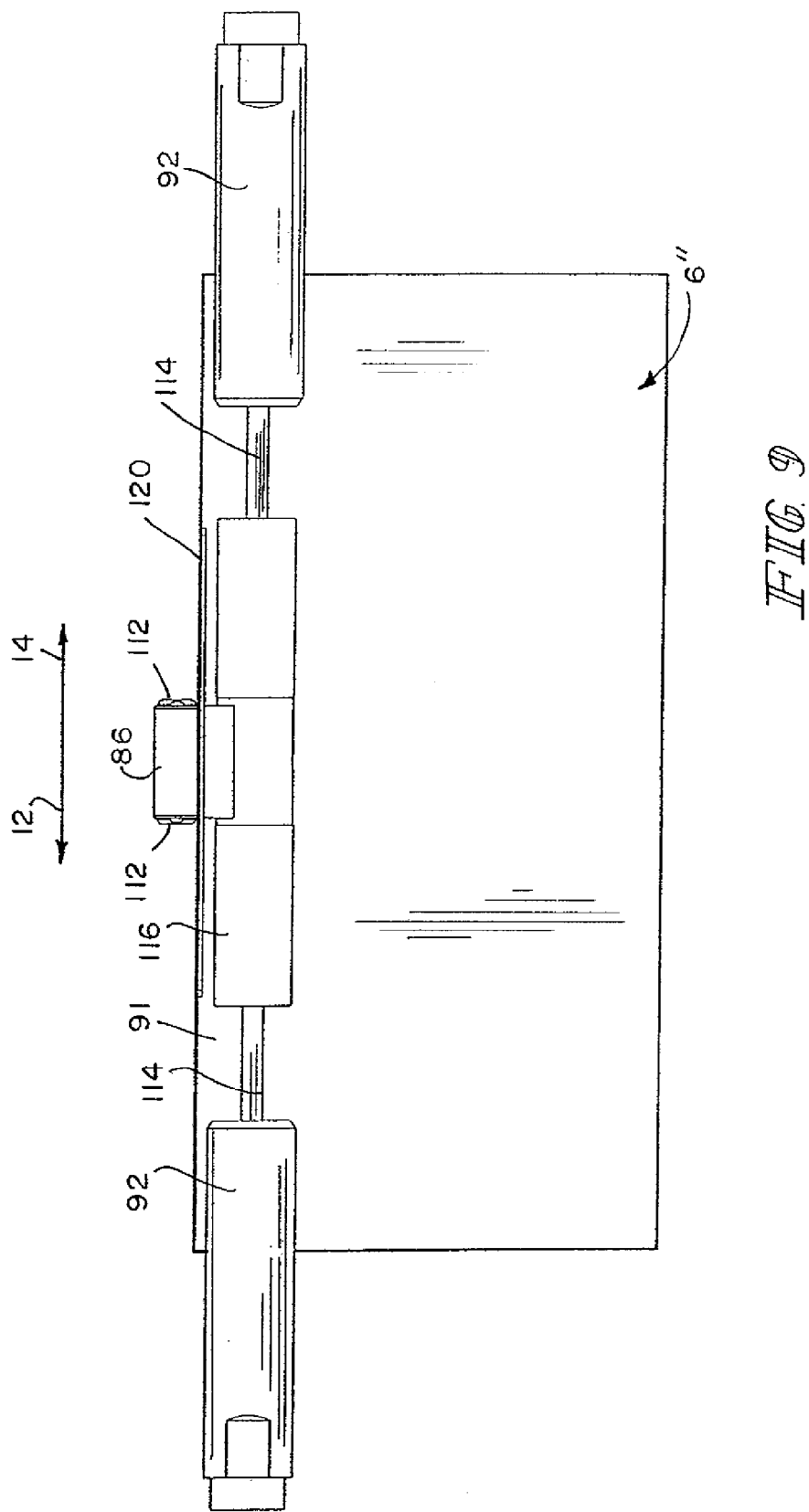
FIG. 9 is an underside view of the carriage of the rodless slide assembly of FIGS. 6-8 showing a portion of the stop assembly.

An underside view of carriage 6", including stop block assembly 82, is shown in FIG. 9. In this illustrative embodiment, shock absorber assemblies 92 include input piston rods 114 which engage a sliding member 116. A fastener 118 (see FIG. 6) attaches stop block 86 to sliding member 116. In the illustrative embodiment, shock absorbers 92 and sliding member 116 are positioned within a suitable bore 91 disposed in carriage 6". The shock absorbers 92 can be threaded or otherwise selectively attached within bore 91 so they can be adjusted with respect to sliding member 116. Sliding member 116 is movable within bore 91 of carriage 6" and transfers impact energy from stop block 86 into the shock absorbers 92 to dampen the impact force when striking catch assembly 84. (See, also, FIG. 7.) It is appreciated that the shock absorbers can be adjusted so not only will the centerline of carriage 6" mate with the centerline of catch bar 96, as shown in FIG. 7, but will also do so by moving rods 114 the full stroke of the shock absorbers, as discussed further herein. Also shown in this view is a cover plate 120 which covers any opening that exists in carriage 6" to accommodate movement of stop block 86 in directions 12 and 14.

Figure 10:
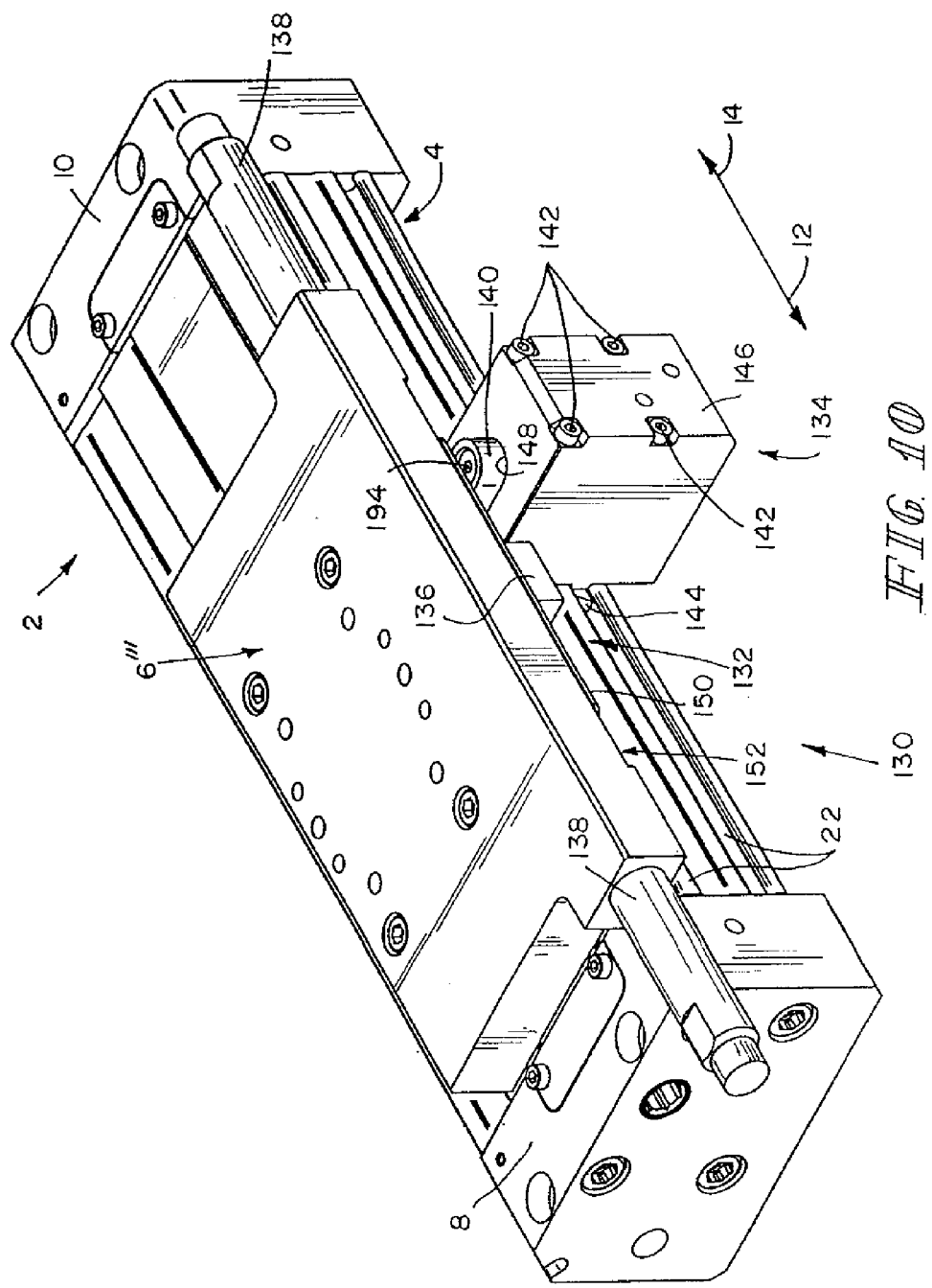
FIG. 10 is a perspective view of another illustrative rodless slide assembly including another illustrative embodiment of a stop assembly.

A perspective view of illustrative rodless slide assembly 2, with another illustrative embodiment of a stop assembly 130 comprising a stop block assembly 132 and catch assembly 134, is shown in FIG. 10. In one embodiment stop block assembly 132 is integrally formed with carriage 6''' which is movable along the length of cylinder 4 in directions 12 and 14, similar to previous embodiments. It can be appreciated that forming stop block assembly 132 and carriage 6''' as a monolithic unit may save material and cost, since less material is used and fewer components are assembled. In addition, stop block 136 is located underneath carriage 6''' as opposed to the side as shown in the prior embodiment. Carriage 6''' extends beyond the edge of cylinder 4 so that stop block 136 is movable along a line oriented in directions 12 and 14 parallel to movement of the slide. Shock absorber assemblies 138 located on opposed sides of stop block 136 are configured to dampen the impact force created when stop block 136 engages catch bar 140 of catch assembly 134. Similar to other embodiments, assembly 134 is configured to attach to slots 22 on the side of cylinder 4 via fasteners 142 that engage T-nuts 144 disposed in slot 22, as illustratively shown herein. Catch bar 140 is extendable from block 146 to selectively engage stop block 136. In this embodiment, catch bar 140 is disposed in a cavity 148 that assists in distributing at least a portion of the impact force as further described herein.

Figure 11:
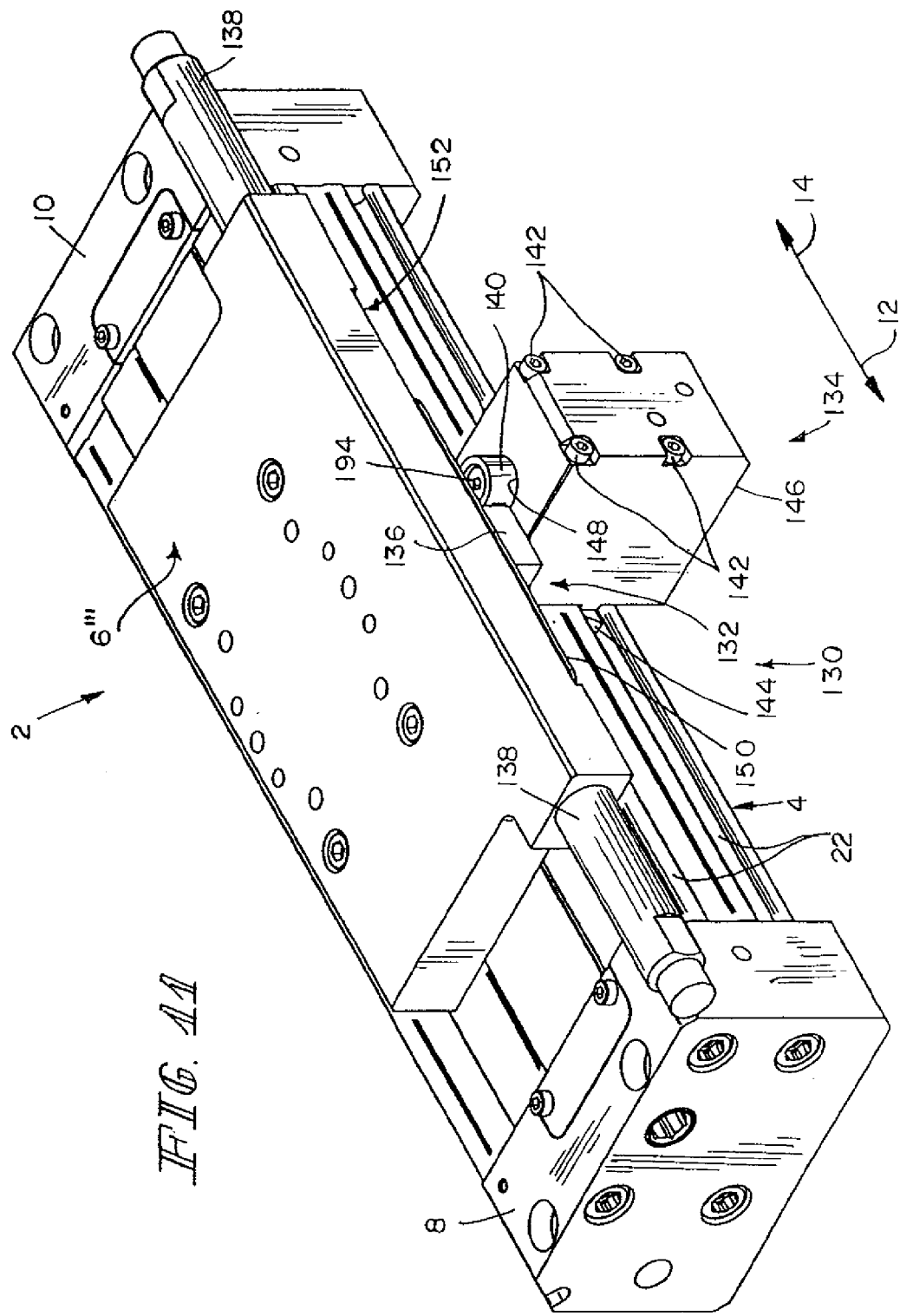
FIG. 11 is another perspective view of the rodless slide assembly of FIG. 10 showing the operation of the stop assembly.

The perspective view of rodless slide assembly 2 shown in FIG. 11 depicts carriage 6''' having moved further in direction 14 until stop 136 impacts catch bar 140. This stops carriage 6'''. As shown, catch bar 140 is extended into the path of stop block 136 to initiate the contact. This view also shows the utility of the shock absorber assemblies 138 and cover plate 150. Not intending to be bound by any theory, it is believed that energy from the movement of carriage 6''', in the form Kinetic and possibly potential energy, dissipates during impact between block 136 and bar 140, Specifically, the impact between catch bar 140 and stop block 136 creates energy that needs to be dissipated. This is accomplished on the stop block assembly 132 side by shock absorber assemblies 138 decelerating carriage 6''' upon impact. In other words, in an illustrative embodiment, carriage 6''' still moves in direction 14 some distance once block 136 impacts bar 140 to allow energy to dissipate, as well as produce a relatively gentle stop of carriage 6'''. Contrasting FIGS. 10 and 11, stop block assembly 132 is located generally within the center of recess 152 disposed in carriage 6''' in FIG. 10. In FIG. 11, assembly 132 moves in direction 12 relative to carriage 6''' to decelerate the same until it comes to rest. Cover plate 150 is illustratively elongated so that any opening on the underside of carriage 6''' is still covered during movement of carriage 6''' or upon its impact with catch assembly 134. It is appreciated that cover plate 150, similar to plate 120, has the utility of shielding any opening from exposure to contaminants or other material that might otherwise enter the interior of carriage 6'''. (See slotted opening 162 in FIG. 13.)

Figure 12:
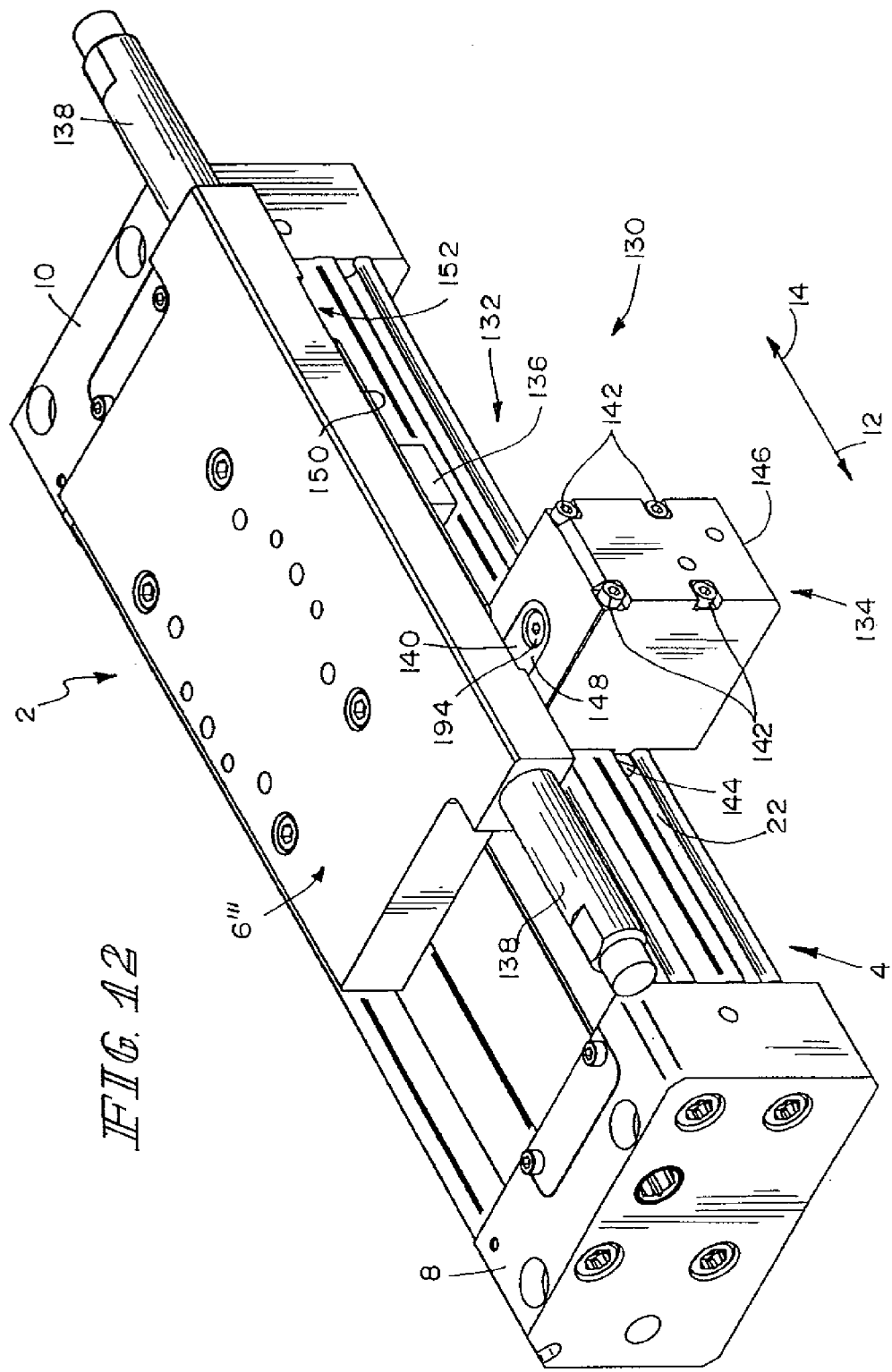
FIG. 12 is a perspective view of the rodless slide assembly of FIGS. 10 and 11, showing the continued operation of the stop assembly.

The perspective view of rodless slide assembly 2 shown in FIG. 12 depicts carriage 6''' moving passed catch assembly 134. Essentially, the views of FIGS. 10-12 demonstrate the movement of carriage 6''' along cylinder 4 to complete a stroke. It is appreciated that although the figures show carriage 6''' moving in direction 14, everything described herein is applicable to carriage 6''' moving in the opposite direction 12. Referring specifically to FIG. 12, catch bar 140 is recessed in cavity 148 of block 146. This clears catch bar 140 as an obstruction from stop block 136 allowing carriage 6''' to continue moving in direction 14. Illustratively, and similar to other embodiments, it is contemplated that as fluid is being applied to move carriage 6''' in direction 14, a force is being applied even as carriage 6''' is being stopped by catch assembly 134. (See FIG. 11.) This force holds carriage 6''' in place until catch bar 140 no longer becomes an obstruction. The fluid pressure can then continue moving carriage 6''' in direction 14. Also shown is stop block 136 returning to its original position within recess 152.

Figure 13:
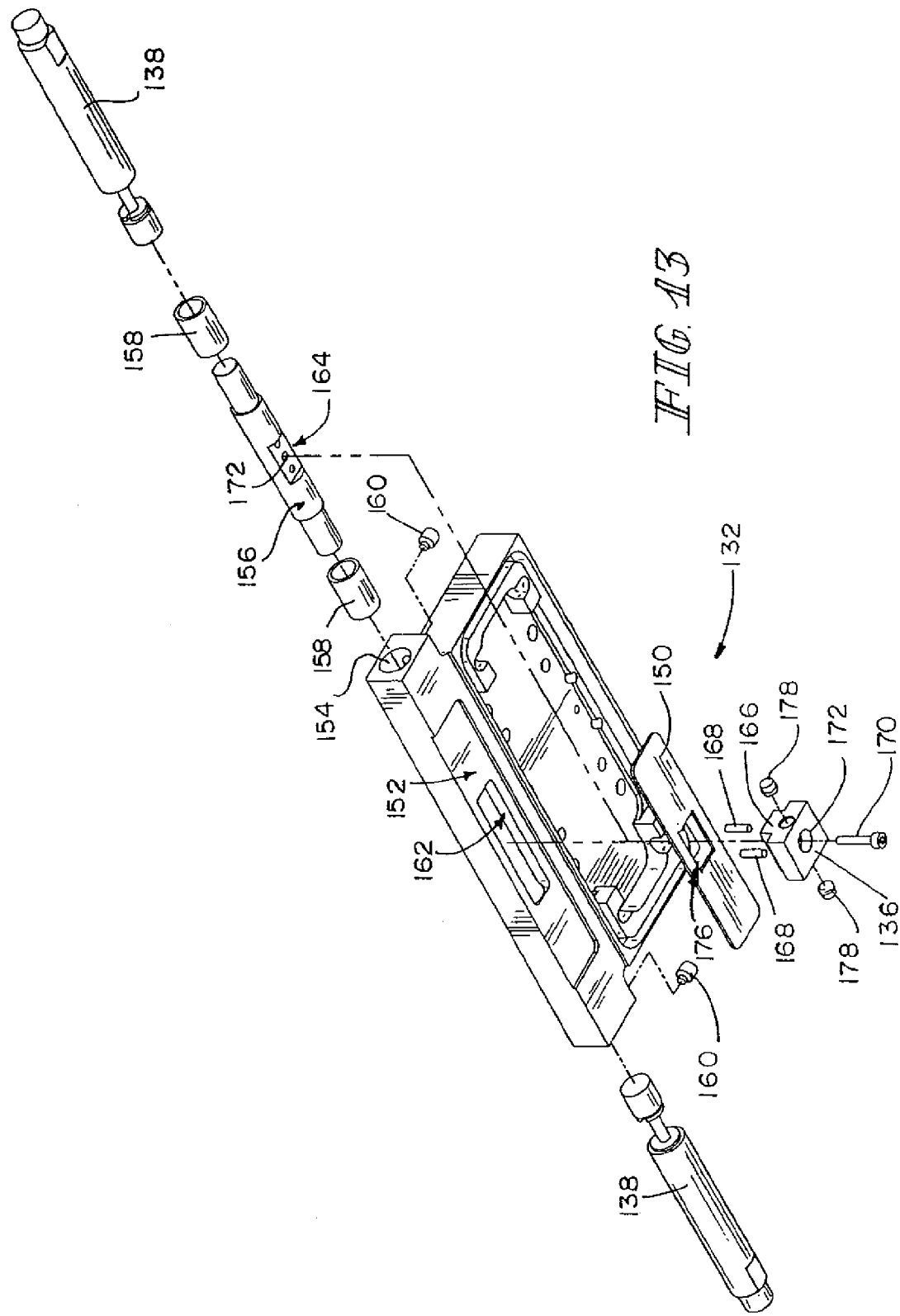
FIG. 13 is an underside exploded-perspective view of the carriage of the rodless slide assembly of FIGS. 10-12, as well as a portion of the stop assembly.

An upward looking exploded-perspective view of the underside of carriage 6''' is shown in FIG. 13. This view shows how stop block assembly 132 can be integrated into the monolithic body of carriage 6'''. As illustratively shown, carriage 6''' comprises a bore 154 within which sliding member 156 is movably positioned. Bushings 158 are illustratively located on each side of sliding member 156 and are either friction fitted or bonded to sliding member 156. Bushings 158 are illustratively made of a low friction polymer or other low friction material to facilitate sliding of sliding member 156 within bore 154. Illustratively, shock absorber assemblies 138 are each in contact with sliding member 156. Shock absorber assemblies 138 are configured to affect the movement of sliding member 156. Furthermore, set screws 160 are disposed in carriage 6''', as illustratively shown in FIG. 13, and are configured to secure shock absorber assemblies 138 to a desired position within bore 154. It is appreciated, however, that shock absorber assemblies 138 can be permanently or removably fixed to facilitate the desired movement and dampening of sliding member 156.

An illustratively slotted opening 162 is disposed in carriage 6''' allowing access external to carriage 6''' to bore 154.

It is contemplated that groove 164 of sliding member 156 is located over slot 162 so that a tongue portion 166 of stop block 136 can be received therein. To facilitate proper mating between the structures, alignment pins 168 are illustratively disposed in both tongue portion 166 and groove 164. Fastener 170 is disposed through a bore 172 of stop block 136, as well as received in another threaded bore 172 of sliding member 156. Cover plate 150 comprises an opening 176 configured to receive the tongue portion 166 of stop block 136. In this illustrative embodiment, shock pads 178 can be coupled to the impact surfaces of stop block 136 to further assist in reducing the energy produced by the impact between stop block 136 and catch bar 140.

Figure 14:
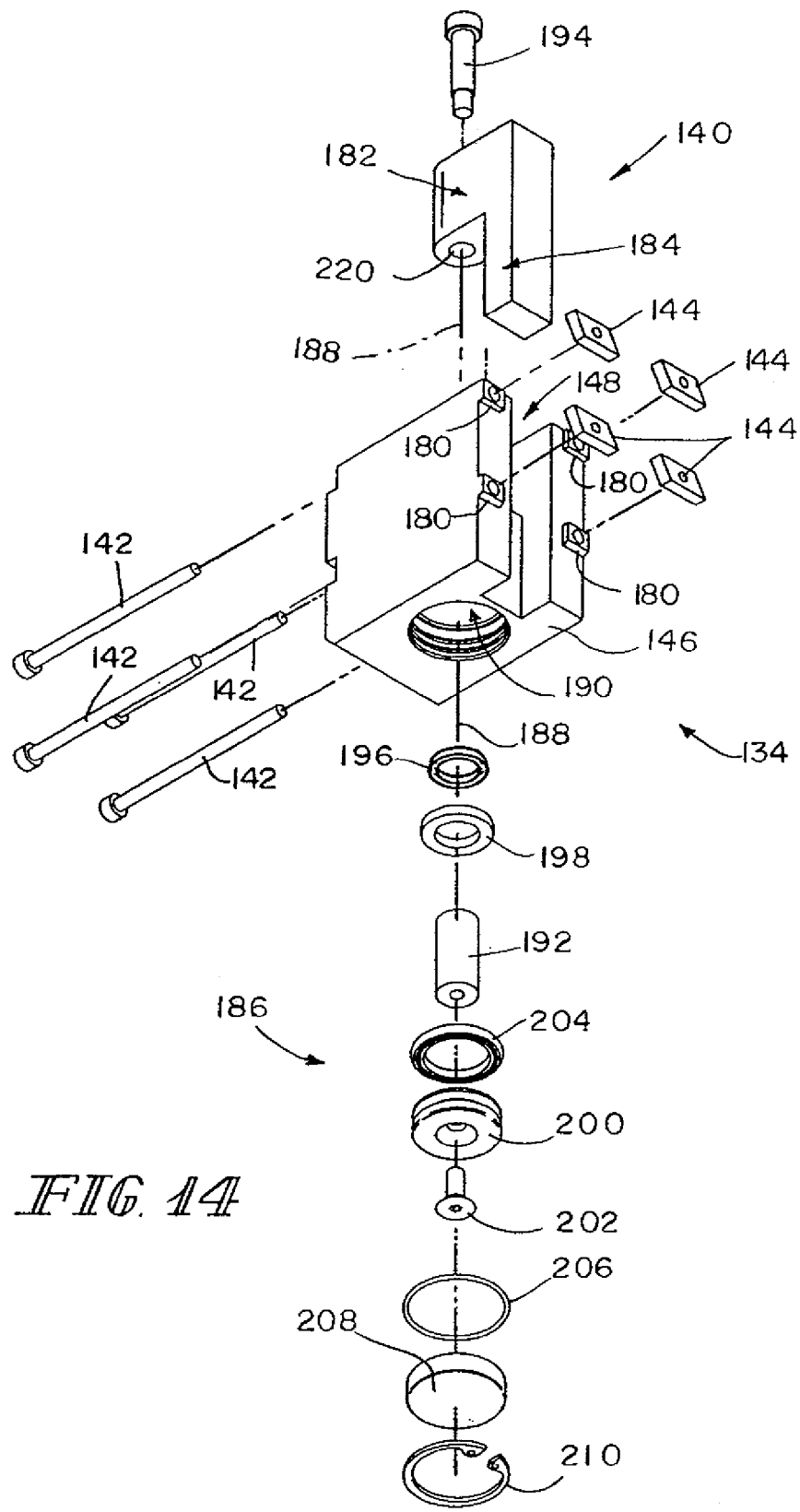
FIG. 14 is an underside exploded-perspective view of a catch assembly.

An exploded view of catch assembly 134 is shown in FIG. 14. Illustratively, block 146 is positioned where carriage 6''' is desired to be stopped. T-nuts 144 engage slots 22 and are secured thereon via fasteners 142. (See, also, FIGS. 10-12.) Ribs 180 illustratively engage a portion of slots 22 to align block 146 with the common access of slots 22 and to prevent rotation of block 146 with respect to slide 2. Catch bar 140 is disposed in cavity 148. In this embodiment catch bar 140 comprises an impact portion 182 and a support portion 184. Impact portion 182 is the part of catch bar 140 that impacts stop block 136. In contrast, support portion 184 does not directly impact stop block 136 but rather the sidewalls of slot 148, as discussed further herein. An illustrative pneumatically-driven piston assembly 186 is configured to move catch bar 140 along axis 188 shown therein. It is appreciated, however, that other actuators may be used, such as an electrically-driven solenoid assembly or the like.

Piston assembly 186 is configured to be located within piston bore 190. Piston assembly 186 comprises a piston rod 192 that attaches to catch bar 140 via fastener 194. Piston rod 192 is disposed through rod seal 196 which is retained in a mating bore (not shown) within block 146 and held by press fit seal retainer 198. Piston 200 is illustratively attached to piston rod 192 via fastener 202. A piston seal 204 is disposed about the periphery of piston 200 to form an air tight seal so that air pressure acting on either side of piston 200 can move the same. The open end of bore 190 is sealed via seal 206, plug 208 and retaining ring 210.

Figure 15:
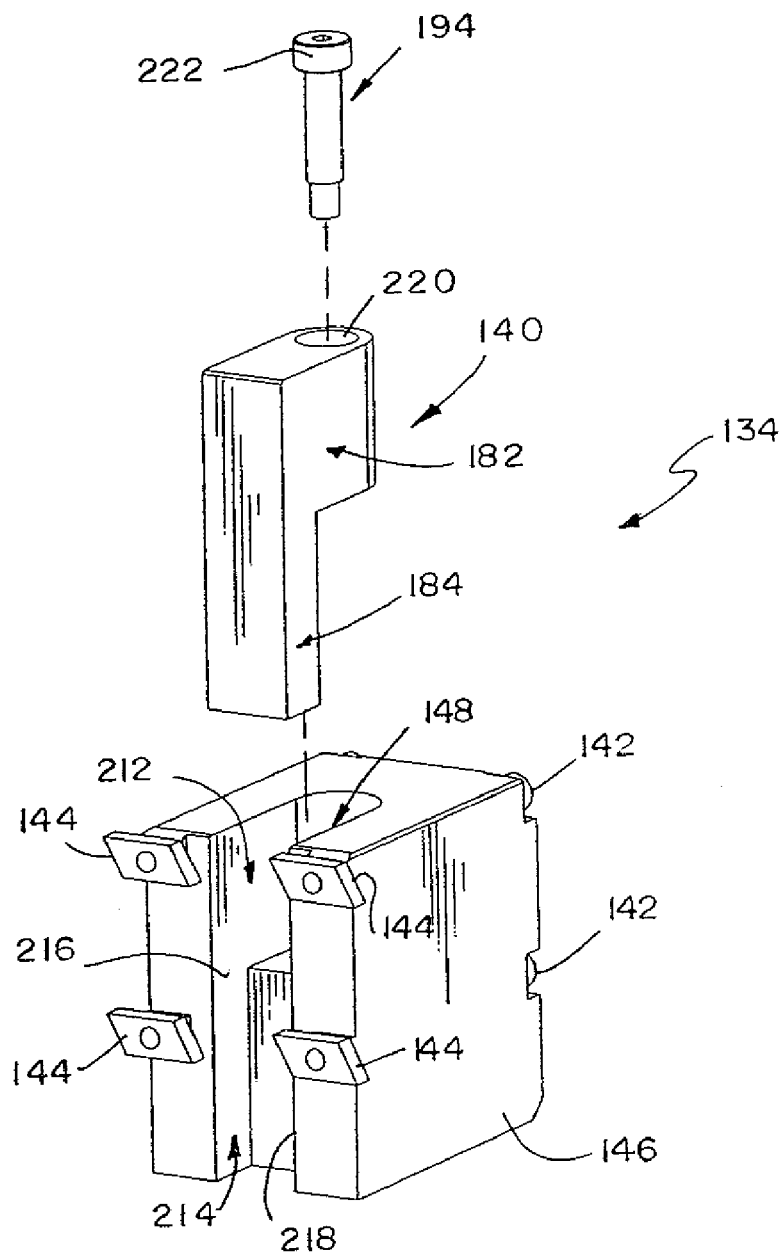
FIG. 15 is an exploded-perspective view of the catch assembly of FIG. 14.

A partially exploded-perspective view of catch assembly 134 is shown in FIG. 15. This view shows the relationship between catch bar 140 and cavity 148. As illustratively shown herein, impact portion 182 of catch bar 140 is positioned in a first support portion 212 within cavity 148. Support portion 184 of catch bar 140 is located in the second support portion 214 of cavity 148. It is appreciated that in an illustrative embodiment, catch bar 140 is open "L-shaped" to help dissipate the impact force or energy produced from the impact between stop block 136 and catch bar 140. It is believed that upon impact of the impact portion 182 of catch bar 140 with stop block 136, catch bar 140 engages the sidewalls 216 (or 218 depending on direction of travel of carriage 6'''). It is further believed that allowing this impact between the catch bar 140 and the sidewall of cavity 148 assists distributing that kinetic energy. This can be further useful so that energy is not transferred into piston assembly 186, which might otherwise result in a reduced operation life if constantly subjected to such impact forces. Furthermore, it is believed that the addition of support portion 184 of catch bar 140, being positioned in the second support portion of cavity 148, provides additional contact surface area where such energy can be dissipated. This is in contrast to simply a rod extending upward from the piston rod which upon impact is believed might transfer kinetic energy down into the piston assembly.

Figure 16:
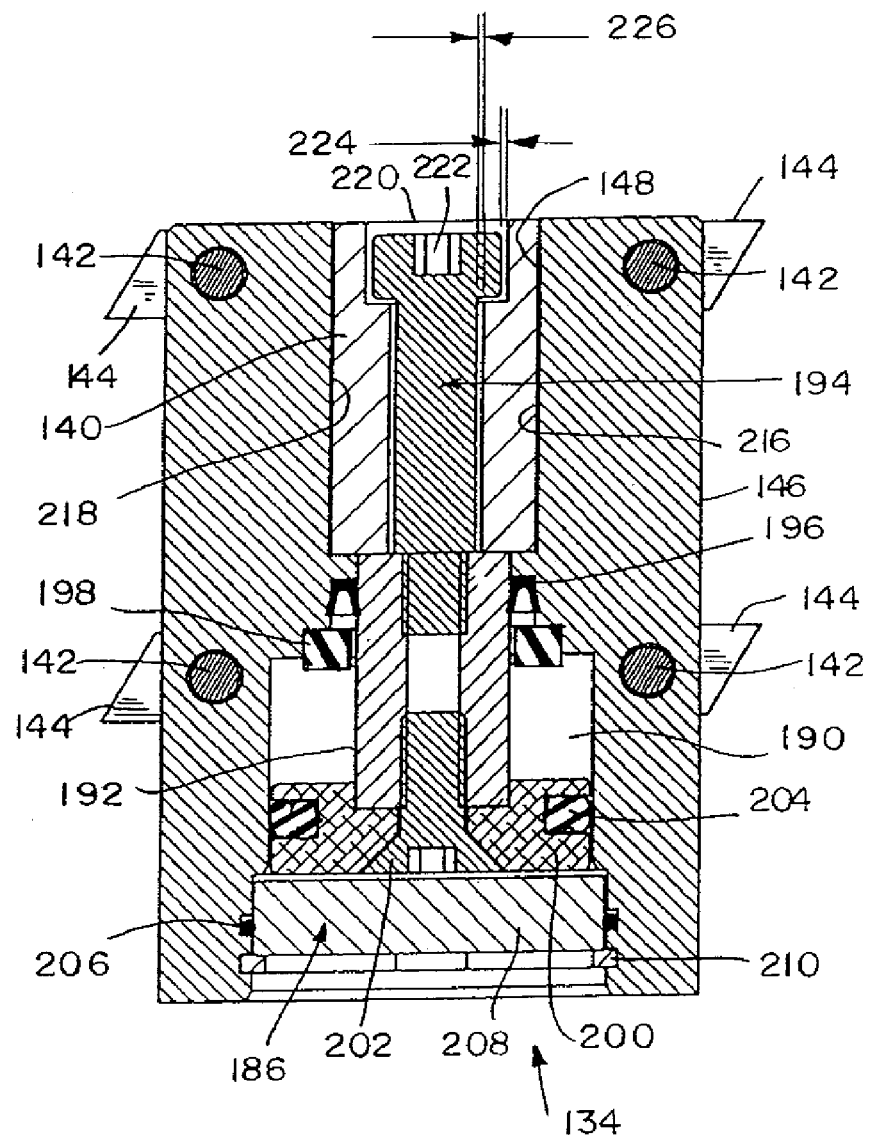
FIG. 16 is a cross-sectional elevational view of the catch assembly of FIGS. 14 and 15.

A cross-sectional elevational view of catch assembly 134 is shown in FIG. 16. This view again shows the force-absorbing characteristics of catch bar 140 and block 146. First, the contact between the walls 216 and 218 of cavity 148 abuts catch bar 140. In addition, in an illustrative embodiment piston assembly 186 is believed further protected while still attached to catch bar 140. Particularly, fastener 194 which may be a shoulder bolt configured to attach to piston rod 192 coupling the same and catch bar 140 together while allowing a radial clearance between fastener head 222 of fastener 194 and bore 220 of catch bar 140, as indicated by reference numeral 224. Similarly, a radial clearance 226 is provided between the shaft of fastener 194 and bore 220 of catch bar 140. This clearance or "play" means that the catch bar can move laterally with respect to the linear movement of piston assembly 186 along axis 188 while assembly 186 and catch bar 140 are coupled and, in the case of catch bar 140, be driven by assembly 186. This configuration allows catch bar 140 to possibly flex or bend slightly, or otherwise move upon impact with stop block 136 (see FIG. 11), while not transferring damaging energy into the piston assembly 186.

Figure 17A:
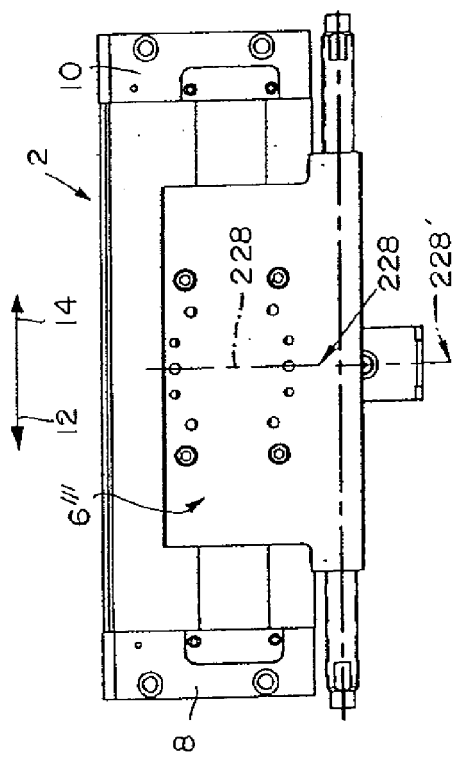
FIGS. 17a-d are top-plan and front cross-sectional views of an illustrative carriage from a rodless slide assembly, as well as a portion of a stop assembly.
Figure 17B:
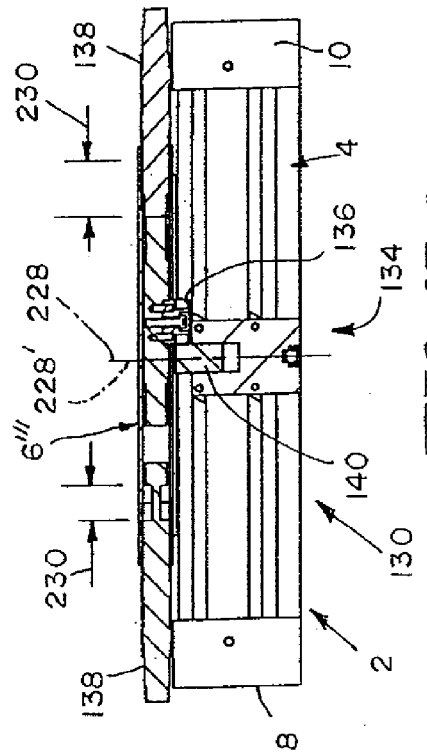
Figure 17C:
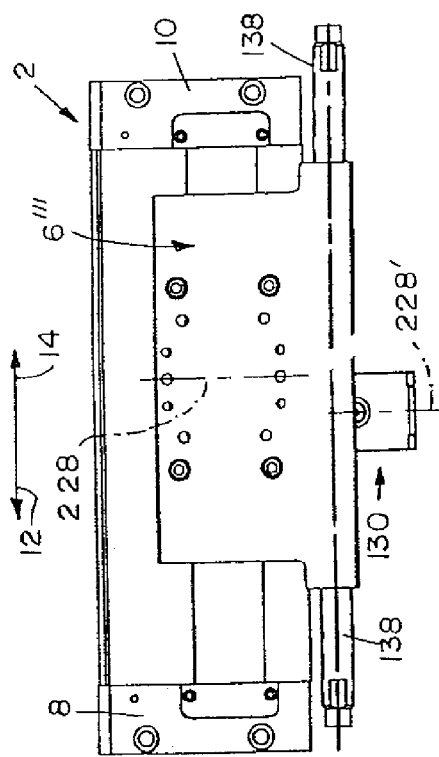
Figure 17D:
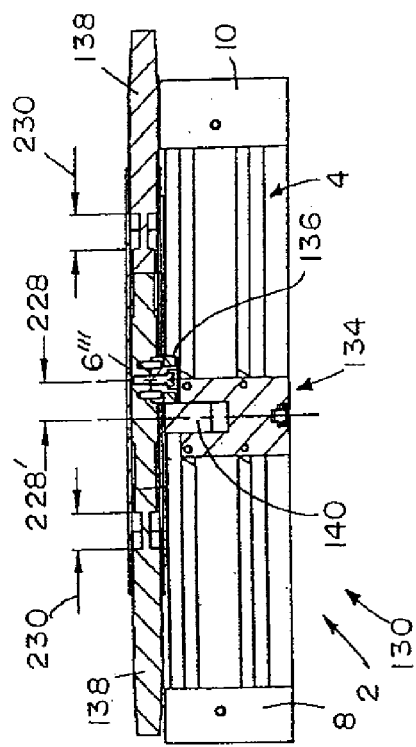

Top-plan and front-elevational cross-sectional views of rodless slide assembly 2 with stop assembly 130 attached thereto are shown in FIG. 17a-d. These views demonstrate how upon impact between stop block 136 and catch bar 140 the centerline 228 of carriage 6''' can be coincident with centerline 228' of catch bar 140 illustratively located in the center of assembly 134 while utilizing essentially equal strokes 230 on shock absorber assemblies 138. As shown in FIGS. 17a and b, carriage 6''' moves in direction 12 with stop block 136 impacting catch bar 140. At this position the centerlines 228 and 228' are offset. The strokes 230 of shock absorber assemblies 138 should be essentially equal distance. It is appreciated that in alternate embodiments, adjustment mechanisms, such as threaded shock members in stop block 136, for example, may be used to allow shock assemblies of different strokes to be used at each end. Because of the direction of travel of carriage 6''', sliding member 156, under urging of stop block 136, compresses one of the shock absorber assemblies 138. (See FIG. 17d.) In this case it is contemplated that the force applied to shock absorber assembly 138 will consume its entire available stroke 230. Because shock absorber assembly 138 is used to decelerate carriage 6''', the full compression is believed to allow a maximum, or at least optimum, amount of kinetic energy to be absorbed by the shock absorber assembly 138 which might have the effect of reducing the impact force that would be transferred into other structures, possibly extending useful life. Also, the net result is that centerline 228 and 228' are substantially coincident, which makes the stopping position of carriage 6''' possibly more predictable and/or reliable.

Figure 18:
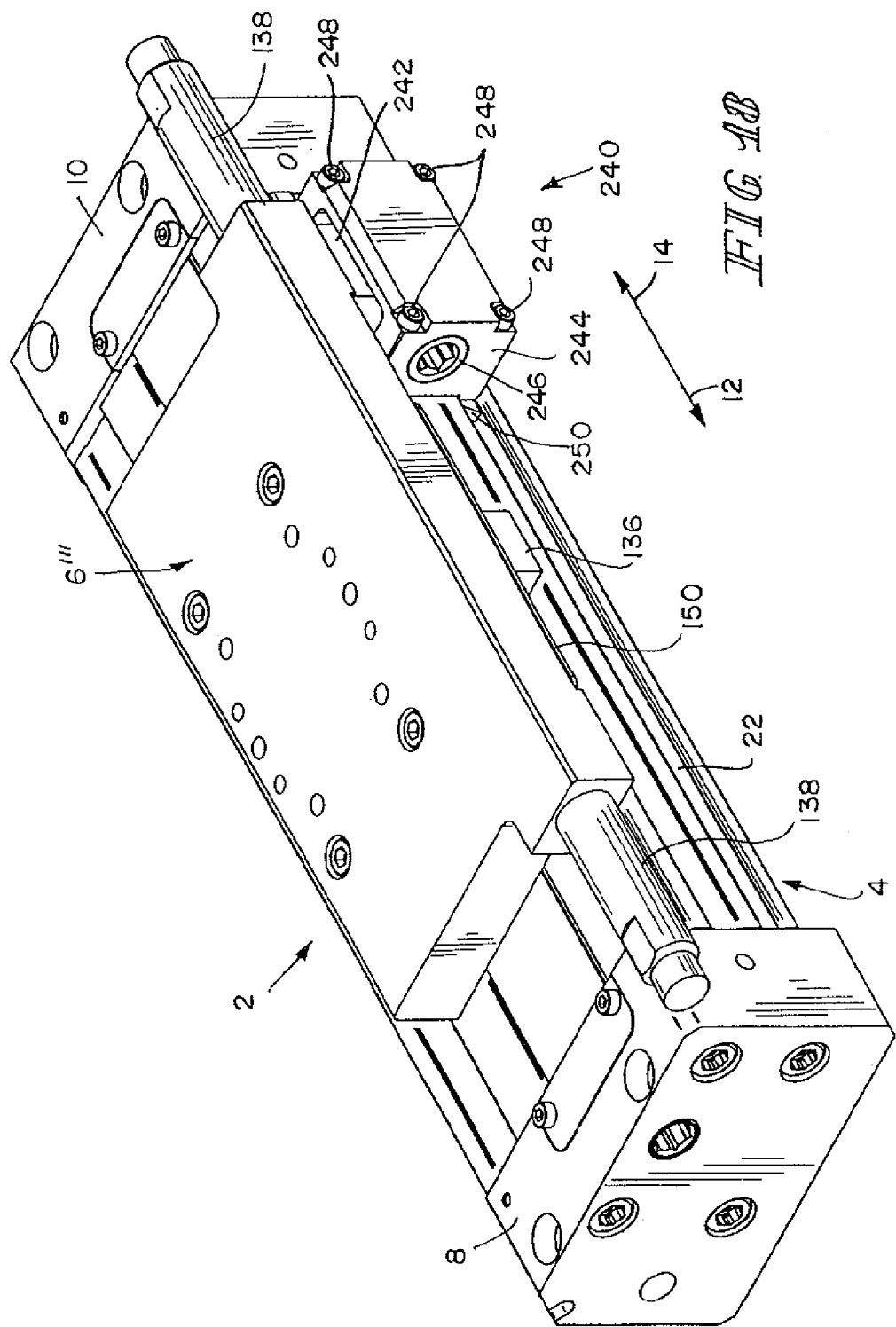
FIG. 18 is a perspective view of another illustrative rodless slide assembly showing an illustrative embodiment of a static stop assembly.

A perspective view of an illustrative rodless slide assembly 2 is shown in FIG. 18. This slide assembly 2 comprises an illustrative embodiment of a static stop assembly 240. Assembly 240 differs from previous stop or catch assemblies described herein in that the catch bar 242 does not retract or otherwise remove itself from the pathway of, in this case, stop block 136 on carriage 6'''. Stop assembly 240 can be useful for stopping carriage 6''' at the ends of a stroke. An illustrative embodiment of static stop assembly 240 comprises a block 244 which contains threaded adjustment screws 246. (See, also, FIG. 19.) It is contemplated that catch bar 242 can be adjustable by adjusting screws 246 allowing movement in directions 12 and 14 without having to remove and adjust the entire block 244. This can be useful because it may provide more precise stopping positions for saddle 6'''. In the illustrative embodiments shown, block 244 is attached to cylinder 4 via fasteners 248 which engage nuts 250 located within slots 22, as previously discussed with respect to other embodiments.

Figure 19:
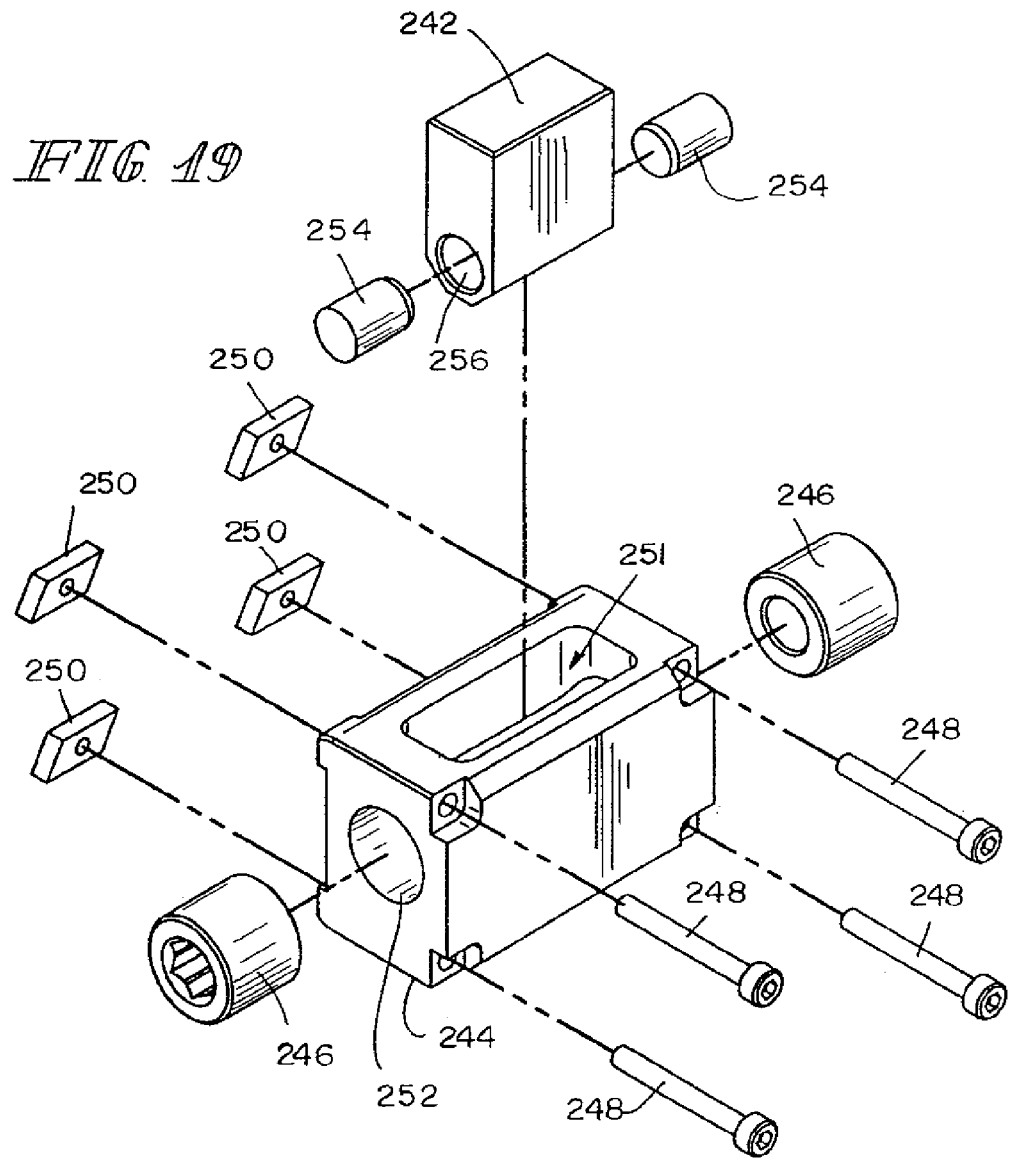
FIG. 19 is an exploded-perspective view of the static stop assembly of FIG. 18.

An exploded view of static stop assembly 240 is shown in FIG. 19. This view shows catch bar 242 being disposed in cavity 251 which is in communication with bores 252. Adjustment screws 246 are illustratively positioned on each side of catch bar 242 and are disposed through bore 252 and into cavity 251. Alignment pins 254 are also illustratively positioned on each side of catch bar 242 and illustratively have a portion disposed in a bore 256. The adjustment screws 246 act on catch bar 242 to move catch bar 242 within cavity 251 having the affect of either extending or reducing the stroke of carriage 6'''.

Figure 20:
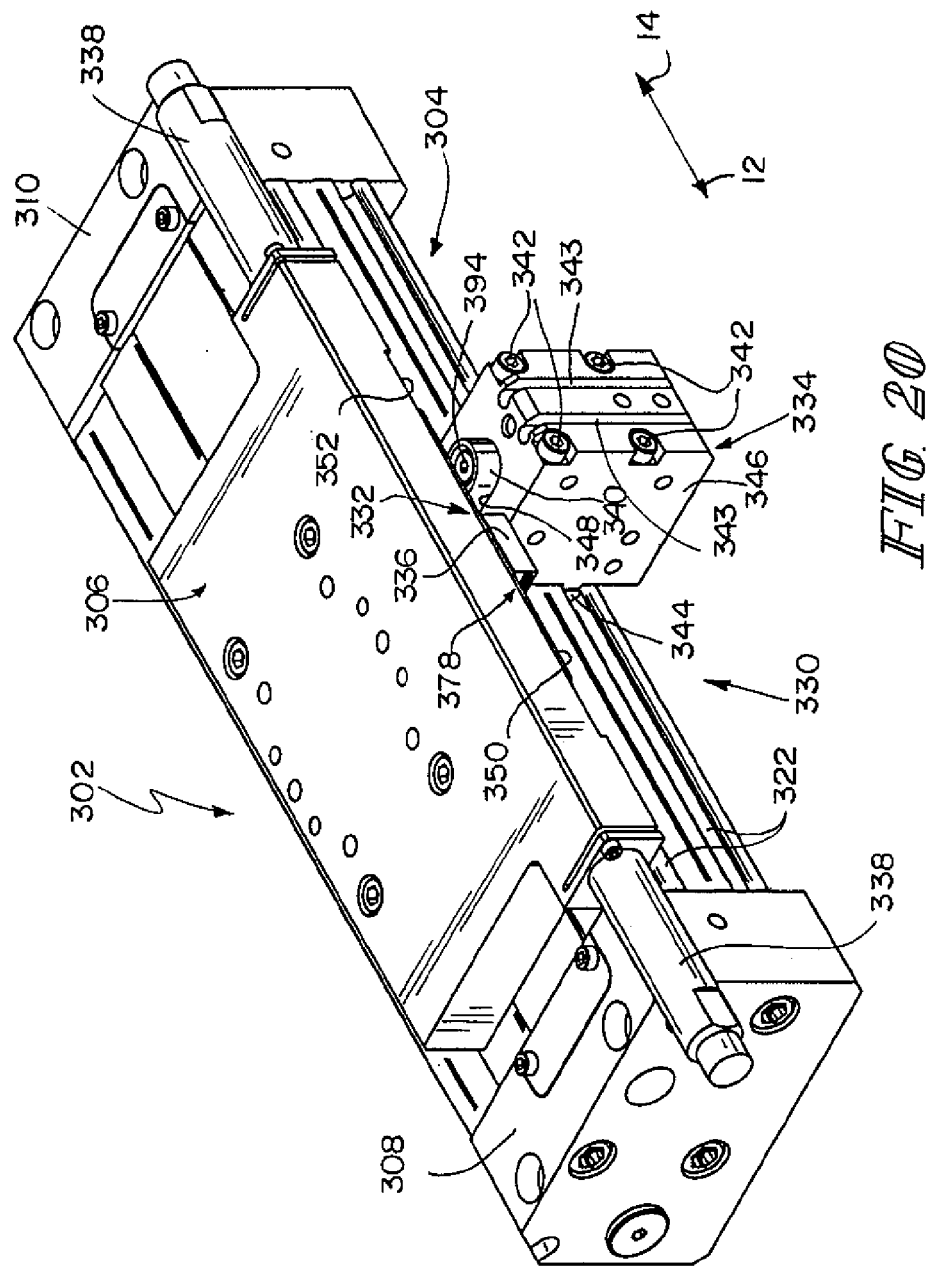
FIG. 20 is a perspective view of another illustrative rodless slide assembly including another illustrative embodiment of a stop assembly.

A perspective view of an illustrative rodless slide assembly 302, with another illustrative embodiment of a stop assembly 330 comprising a stop block assembly 332 and a catch assembly 334, is shown in FIG. 20. In one illustrative embodiment, stop block assembly 332 is coupled with carriage 306 which moves along the length of cylinder 304 in directions 12 and 14. Similar to the embodiment described in FIGS. 10-12, stop block 336 is located under carriage 306. Also, similar to previous embodiments, shock absorber assemblies 338 are located on opposed sides of stop block 336 and are configured to dampen the impact force created when stop block 336 engages catch bar 340 when extending from block 346 of catch assembly 334. Also shown in this view are fasteners 342 configured to engage bars 344 disposed in slots 322 to hold assembly 334 in place.

Similar to previous embodiments, slide assembly 302 includes end caps 308 and 310. Stop block 336 includes a shock pad 378 configured to engage catch bar 340. Pad 378 may illustratively be manufactured from urethane and have a complimentary geometry to a recess in stop block 336. Such recesses may be formed on each side of stop block 336. Also shown in this view are switch slots 343 which can receive a sensor switch to detect the position of catch bar 340. In this illustrative embodiment two slots are located in block 346 so that two sensors can be installed, one of which senses when bar 340 is extended and the other senses when bar 340 is retracted.

Figure 21:
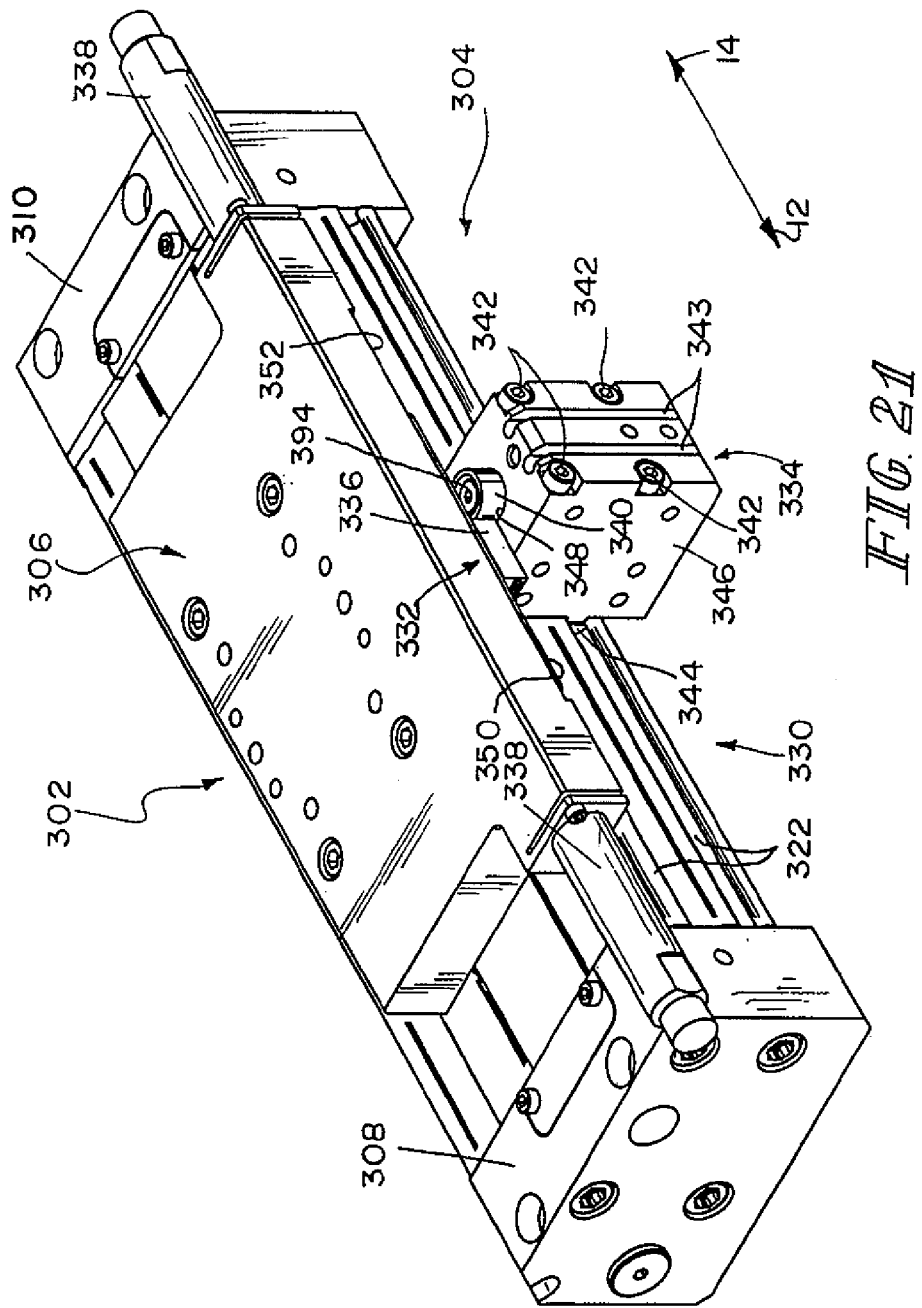
FIG. 21 is another perspective view of the rodless slide assembly of FIG. 20 showing the operation of the stop assembly.

The perspective view of rodless slide assembly 302 shown in FIG. 21 depicts carriage 306 having moved further in direction 14 where stop 336 impacts catch bar 340 to stop carriage 306. Catch bar 340 is extended into the path of stop block 336 to initiate contact. As with other embodiments, shock absorbers 338 serve to dissipate energy created by the impact between stop 336 and catch bar 340.

Stop block 336 is generally located within the center of recess 352 disposed on carriage 306, as shown in FIG. 20. Assembly 332 moves in direction 12 relative to carriage 306 to decelerate the same until it comes to rest, as shown in FIG. 21. Cover plate 350 (similar to cover plate 150) is illustratively elongated so that opening 362 on the underside of carriage 306 (see FIG. 23) remains covered during movement of carriage 306 including its impact with catch assembly 334. Also similar to cover plate 150 and 120, plate 350 shields opening 362 from exposure to contaminants that might otherwise enter the interior of carriage 306.

Figure 22:
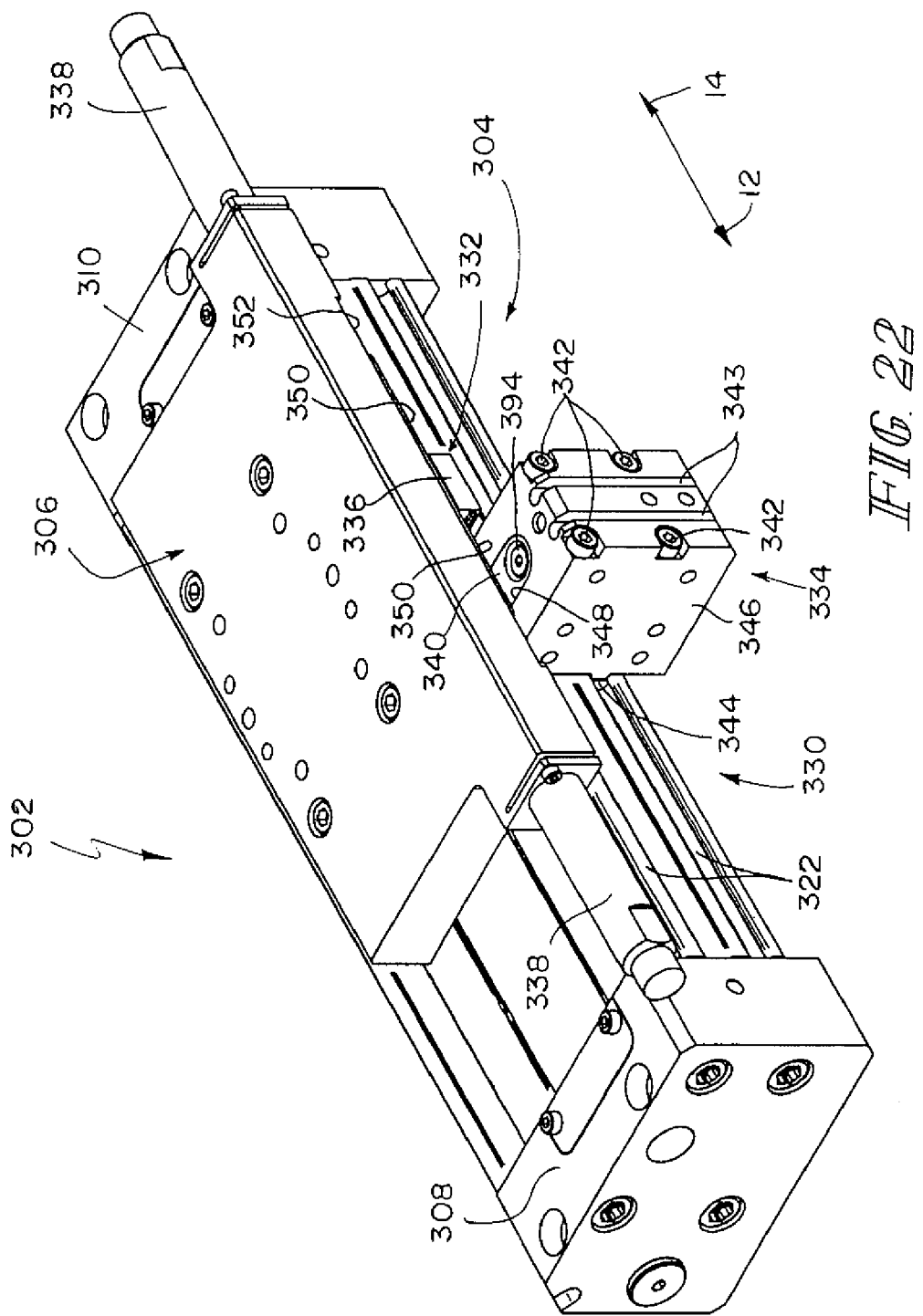
FIG. 22 is a perspective view of the rodless slide assembly of FIGS. 20 and 21, showing the continued operation of the stop assembly.

The perspective view of rodless slide assembly 302 shown in FIG. 22 (similar to FIG. 12) depicts carriage 306 moving past catch assembly 334. Similar to views of previous embodiments, the views of FIGS. 20-22 demonstrate movement of carriage 306 along cylinder 304 in direction 14. In this view, catch bar 340 is recessed in cavity 348 of block 346. This clears catch bar 340 as an obstruction from stop block 336 allowing carriage 306 to continue moving in direction 14. As previously discussed with other embodiments, it is contemplated that as a force is being applied to move carriage 306 in direction 14, that force continues to be applied as carriage 306 is being stopped by catch assembly 334. This force will hold carriage 306 in place until catch bar 340 is moved as an obstruction, as shown in FIG. 22. That force continues to move carriage 306 in direction 14 until the end of the stroke is reached.

Figure 23:
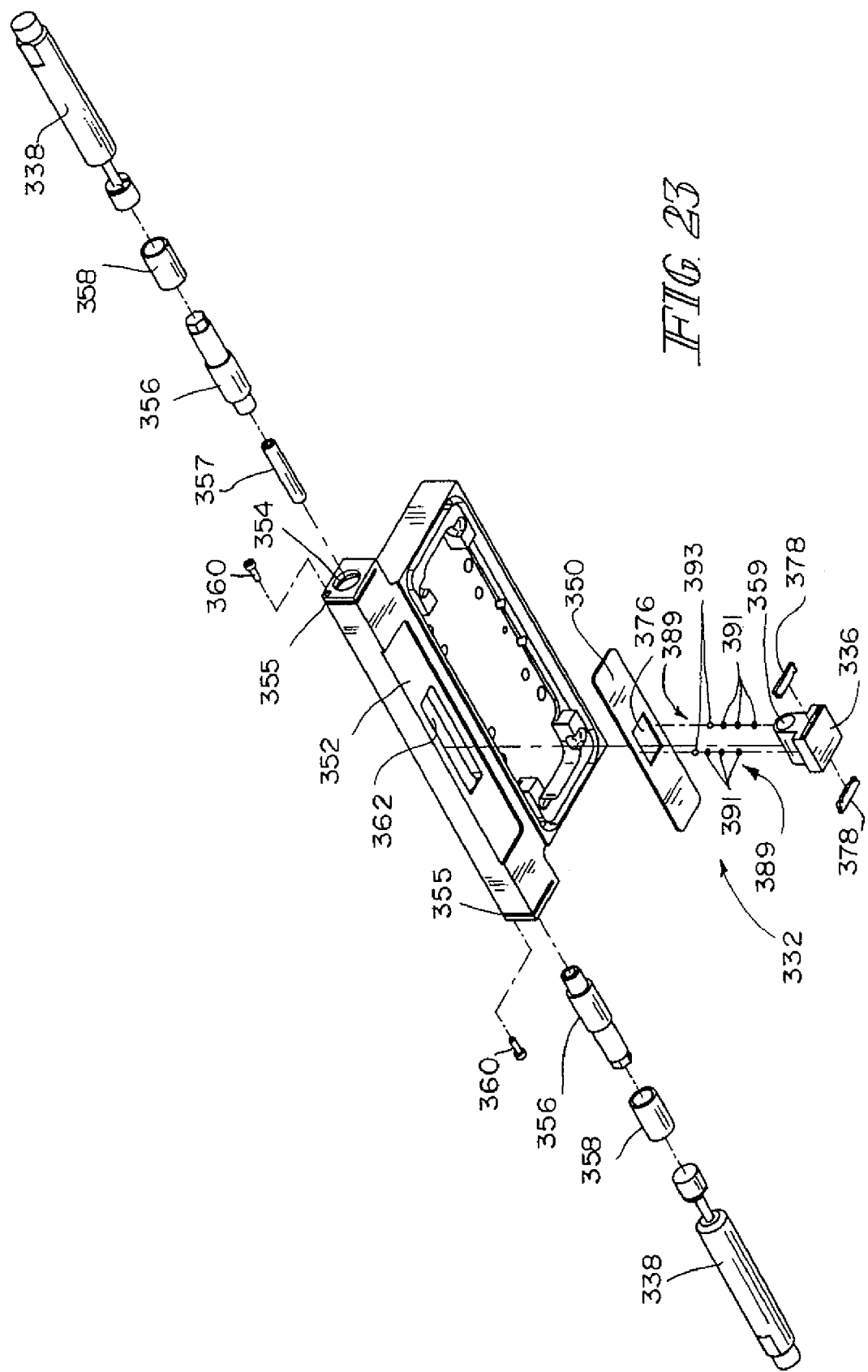
FIG. 23 is an undersided exploded-perspective view of the carriage of the rodless slide assembly of FIGS. 20-22.

An exploded perspective view of the underside of carriage 306 is shown in FIG. 23. Like the similar view of the previous embodiment, this view depicts how stop block assembly 332 may be integrated into the body of carriage 306. As illustratively shown, carriage 306 includes a bore 354 within which two sliding members 356 are located and attached to fastener 357. This fastener 357 is also configured to dispose through bore 359 of stop block 336. In one illustrative embodiment, fastener 357 may be a socket set screw that fastens to both sliding members 356 and disposed through bore 359 of stop block 336. Illustratively, stop block 336 is pinched between sliding members 356. (See, also, FIGS. 29b and d). Bushings 358, similar to bushings 158, are located on sliding members 356. Also similar to bushings 158, bushing 358 can be either friction fitted or bonded to sliding members 156 and can be made of a low friction polymer or other low friction material to facilitate sliding of members 356 within bore 354. Shock absorbers 338 are configured to dampen movement of sliding members 356, as well as stop block 336. In one illustrative embodiment shock absorbers 338 are fastened by threads inside bore 354. To assist in locking shock absorbers 338 in place a slot 355 is cut into the threaded portion of bore 354. A set screw 360 is disposed in carriage 306 and into slot 355 adjacent bore 354, to reduce the width of slot 355. This pinches the threads in the wall of bore 354 together which secures shock absorber 338 in place.

Slotted opening 362 is disposed in carriage 306 allowing internal access of carriage 306 from bore 354. Cover plate 350 comprises an opening 376 configured to receive bore 359 of block 336. In this embodiment, shock pads 378 replace shock pads 178 of the prior embodiment to engage catch bar 140. Also shown in this view are stabilizers 389 which illustratively include springs 391 and bearings 393 to stabilize stop block 336 relative to plate 350. In this embodiment, springs 391 (o-rings as illustratively shown in this view) bias bearings 393 against plate 350. This helps prevent stop block 336 from pivoting about fastener 357.

Figure 24:
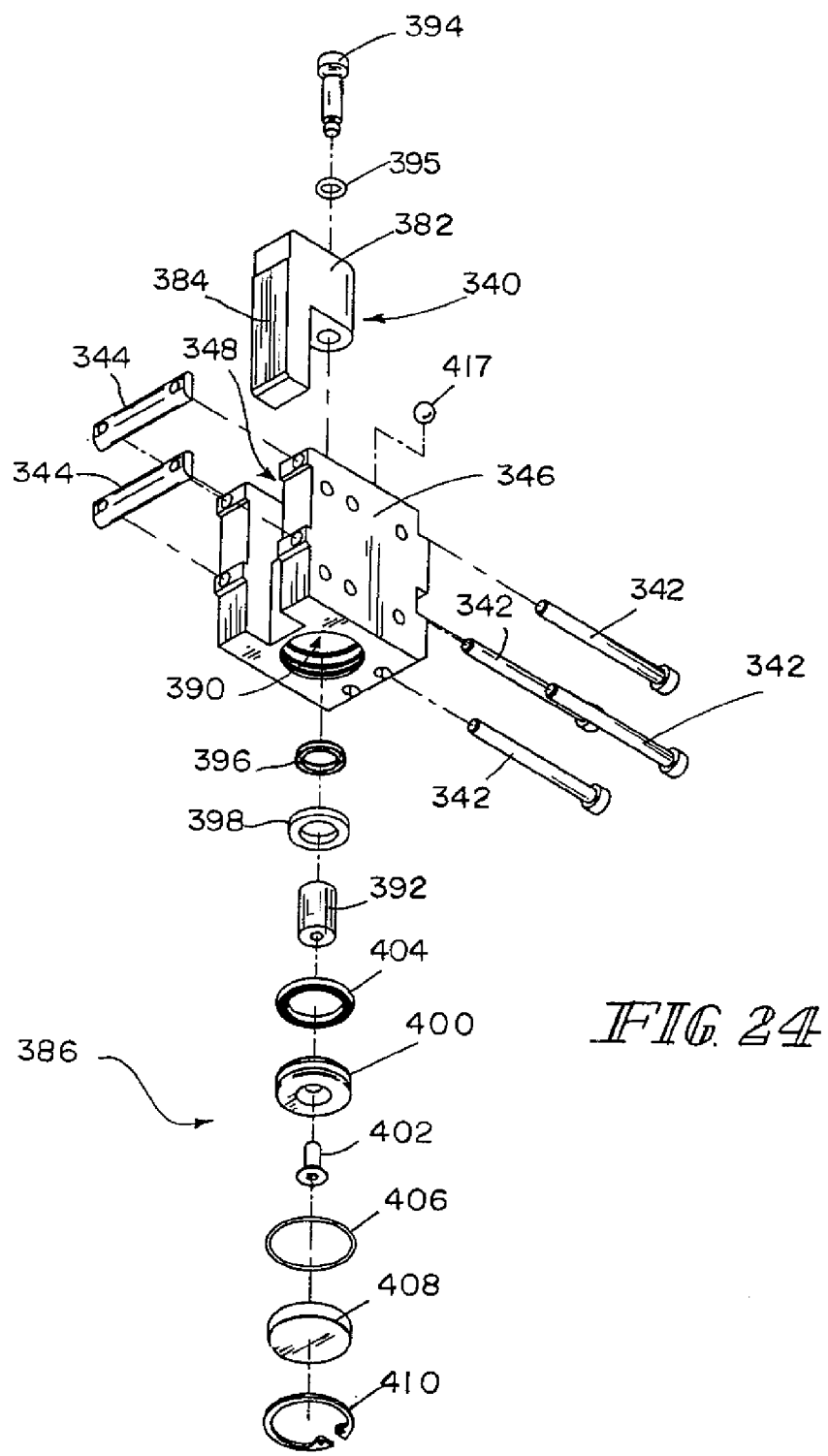
FIG. 24 is an exploded perspective view of another embodiment of a catch assembly.

An exploded view of catch assembly 334 is shown in FIG. 24. Block 346 is illustratively positioned where carriage 306 is decided to be stopped. In this embodiment, however, t-nuts 144 are replaced with bars 344 which can be used to add holding strength in a high side impact environment. It is appreciated that bars 344 can be attached to ribs via fasteners 342, similar to t-nuts 144 of the previous embodiment, which can align block 346 on slide 302. Also, similar to this previous embodiment, catch bar 340 is disposed in cavity 348.

Also shown is ball 417 that caps bore 429. (See, also, FIGS. 26a and b.) Catch bar 340 may further comprise an impact portion 382 and a support portion 384. Impact portion 382 is the part of a catch bar 340 that impacts stop block 336. In contrast, support portion 384 does not directly impact stop block 336, but rather the sidewalls of cavity 348. Fastener 394 is disposed through bar 340, as well as an o-ring or washer 395, so it may be configured to assist stabilizing catch bar 340. Also shown in this view is piston assembly 386 that is disposed in bore 390 of block 346.

Piston assembly 386 comprises a piston rod 392 that attaches to fastener 394. Piston rod 392 is disposed through rod seal 396 which is retained in a mating bore (not shown) within block 346 and held illustratively by press fit seal retainer 398. Piston 400 is illustratively attached to piston rod 392 via fastener 402. A piston seal 404 is disposed about the periphery of piston 400 to form an airtight seal so air pressure acting on either side of piston 400 can move the same. The open end of bore 390 is sealed via seal 406, plug 408 and retaining ring 410.

Figure 25:
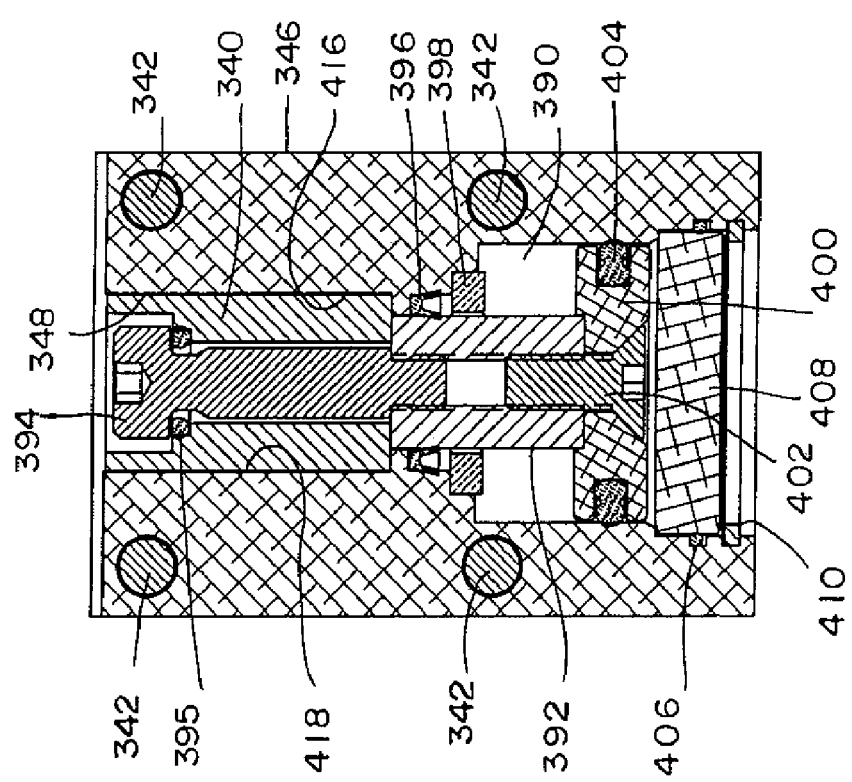
FIG. 25 is a cross-sectional elevational view of the catch assembly of FIG. 24.

A cross-disectional elevation view of catch assembly 334 is shown in FIG. 25. This view again shows the force-absorbing characteristics of catch bar 340 and block 346. Similar to the previous embodiment, the contact between walls 416 and 418 of cavity 348 abuts catch bar 340. Fastener 394 with washer 395 disposed thereabout is shown extending through catch bar 340.

Exploded, sectional and detailed perspective views of catch assembly 334 is shown in FIGS. 26*a-c*. As shown in the exploded view of FIG. 26*a*, an illustrative embodiment includes a magnet holder assembly 409 which includes disk magnets 411 and 413 that are held within a magnet holder 415. It is appreciated that in other illustrative embodiments the holder may include one or more magnets. Illustratively, magnet holder 415 includes at least one neck 421, and possibly a plurality. Dowels 423 and 425 are disposed in catch bar 340, as illustratively shown. In one illustrative embodiment, to assist securing dowels 423 and 425 in place, dowel 427 is disposed therebetween to displace material in the bores within bar 340 to maintain the dowels in place. As shown in FIG. 26*b*, magnet holder assembly 409 is located within bore 429 capped by ball 417. As catch bar 340 moves upward, so too does magnet holder 415 with magnets 411 and 413 located therein. Similarly, as catch bar 340 is lowered, so too is magnet holder assembly 409. The concurrent movement between assembly 409 and bar 340 is accomplished via dowel pins 423 and 425, as shown in FIG. 26*c*. This view shows pins 423 and 425 disposed in neck 421 of magnet holder 415. Also shown in this view is dowel 427. In one illustrative embodiment the size and/or configuration of catch bar 340 or block 346 may be changed. This might affect the positioning of magnet holder 415 relative to dowels 423 and 425. Therefore, a second neck 421 is formed in holder 415 so it can be used for different size assemblies 334. It is appreciated that sensors can be attached to slide 302, possibly at slots 343, to detect the changing position of catch bar 340 by the changing position of magnet holder assembly 409. This will allow the operator to monitor the positioning of catch bar 340 as desired.

Perspective and cross-sectional views of catch assembly 334 are shown in FIGS. 27*a* and *b*. These views include a valve assembly 610 that attaches to block 346 to distribute fluid to piston assembly 386 to move catch bar 340 in directions 612 and 614. As shown in FIG. 27*a*, valve assembly 610 includes a block 616 having a fluid inlet exhaust 618 and a fluid inlet port 620 disposed therein. It is appreciated that these ports are configured to receive air tubes (not shown) to supply fluid such as air or other vapor, or exhaust fluid, to or from block. It can be further appreciated that this valve assembly can be of the type known by those skilled in the art. In the embodiment shown, valve assembly 610 comprises sealing rings 622, 624, nipples 626, and 628 each having a threaded stem that fastens to the valve 610 and o-rings 630 and 632 respectively. These structures are disposed in bores 634 and 636. Retaining dowels 638 and 640 are disposed in block 346, as illustratively shown, and are held in place with the assistance of retaining fastener 642 and washer 644. The view shown in FIG. 27*b* depicts the placement of the valve structures. For example, nipples 626 and 628 are shown disposed in bores 634 and 636, respectively, with o-rings disposed thereabout. Retaining dowels 638 and 640 extend into nipples 626 and 628, but do not impede their fluid passages 650 and 652, respectively. It is contemplated that to move catch bar 340 in direction 614 fluid is supplied to passage 650 of nipple 626 which supplies fluid into bore 634 and through passageway 654 and into chamber 390, as illustratively shown. Conversely, to move catch bar 340 in direction 612, fluid is supplied to passage 652 of nipple 626 and into bore 636 and through passage 656 into bore 390. Also shown in this view is stop ball 660 which seals the exit of passageway 654 and ball 417, which seals the end of bore 429 and accommodates magnet holder assembly 409. (See FIG. 26*b*.)

Figure 28:
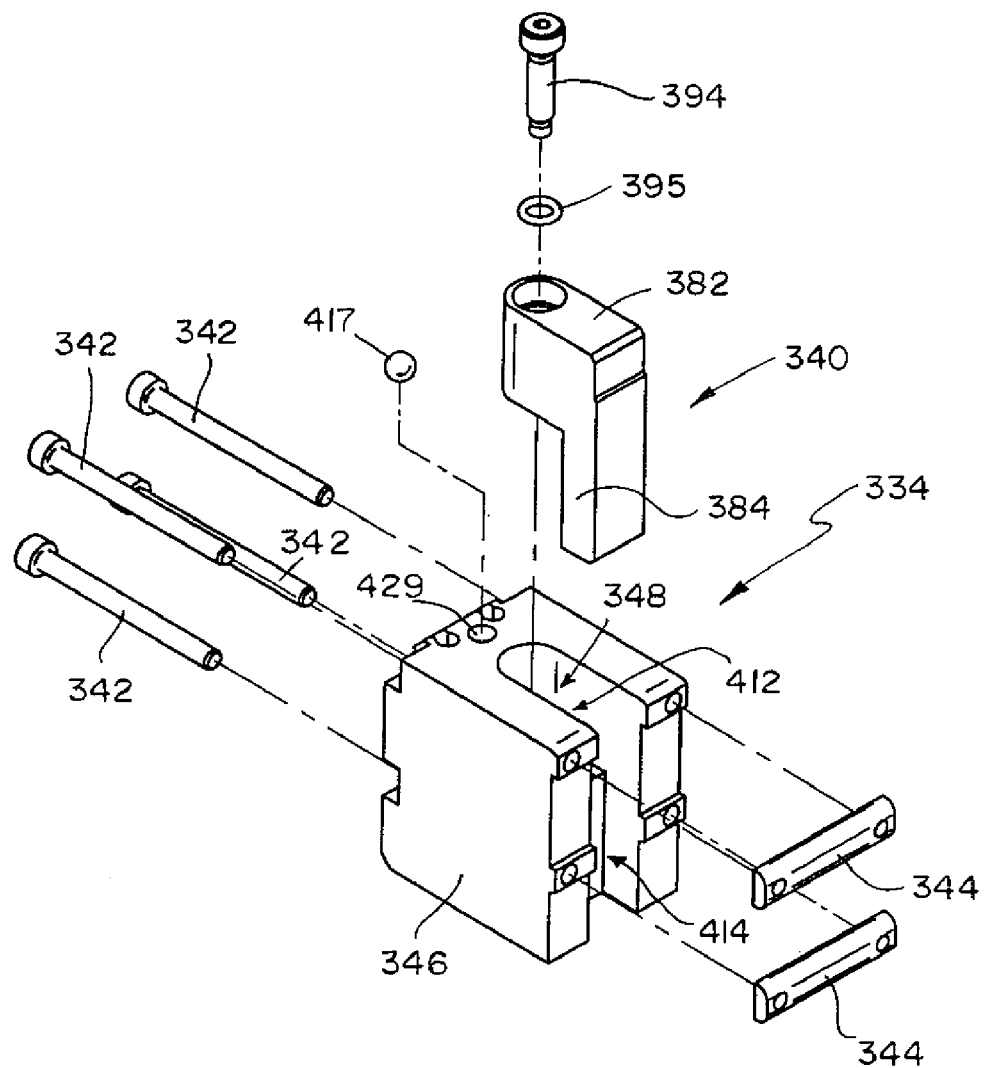
FIG. 28 is an exploded view of the catch assembly of FIGS. 24-26.

An exploded view of catch assembly 334 is shown in FIG. 28. This view, similar to assembly 134 of FIG. 15, shows the relationship between catch bar 340 and cavity 348. The impact portion 382 of catch bar 340 is positioned in a first support portion 412 within cavity 348. Support portion 384 of catch bar 340 is located in the second support portion 414 of cavity 348. Like catch bar 140, catch bar 340 is "L-shaped" to help dissipate the impact force of energy produced from the impact between stop block 336 and catch bar 340. Also shown in this view is ring 395 that receives fastener 394 and ball cap 417 that seals the opening of bore 429. This view further shows fasteners 342 and bars 344.

Top-plan and front-elevational cross-sectional views of rodless slide assembly 302 with stop assembly 330 attached thereto are shown in FIGS. 29*a-d*. Similar to the views shown in FIGS. 17*a-d*, these views demonstrate how, upon impact between stop block 336 and catch bar 340, the center line 428 of carriage 306 can be coincident with center line 428' of catch bar 340 illustratively located in the center of assembly 334 while utilizing essentially equal strokes 430 on shock absorbers 338. As shown in FIGS. 29*a* and *b*, carriage 306 moves in direction 14 with stop block 336 impacting catch bar 340. At the point of impact the center lines 428 and 428' are offset as shown. Also like previous embodiments, the strokes 430 of shock absorber assemblies 338 can be about equal distance. As shown in FIG. 29*d*, the direction of carriage 306 and sliding member 356, under urging of stop block 336, compresses one of the shock absorbers 338. As shown here, the force applied against the shock absorber may consume the entire stroke 430. Similar to previous embodiments, since shock absorber assembly 338 is used to decelerate carriage 306, the compression is believed to allow kinetic energy to be absorbed by shock absorber assembly 338 which may have the effect of reducing the impact force that would be transferred into other structures. This may possibly extend the useful life of the slide assembly. As shown in FIGS. 29*c* and *d*, center lines 428 and 428' are substantially coincident which can make the stopping position of carriage 306 possibly more predictable and/or reliable. The same coincident centerline may be achieved when saddle 306 is moving in direction 12 toward stop assembly 330.

Figure 30:
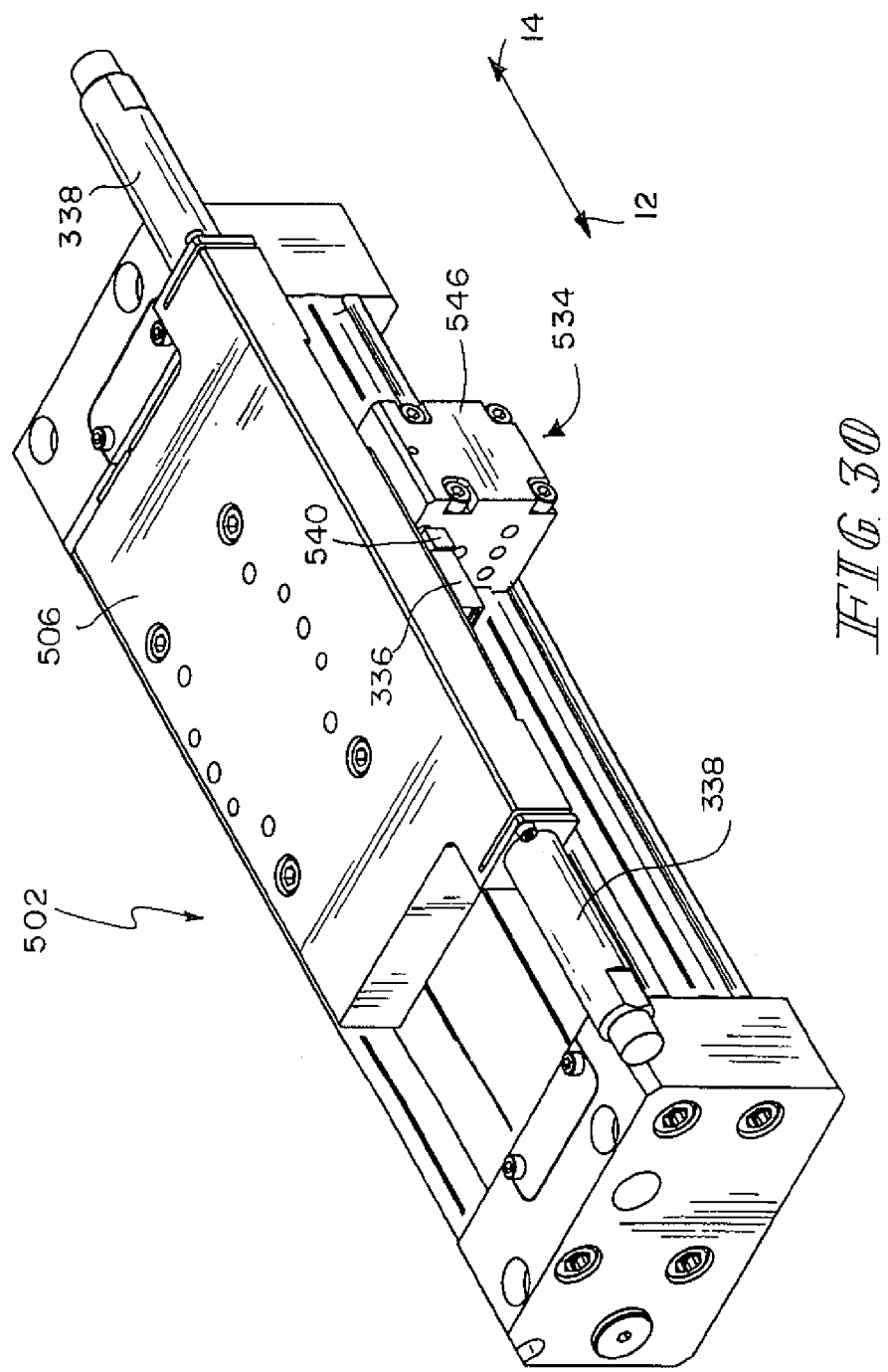
FIG. 30 is a perspective view of another illustrative rodless slide assembly showing another illustrative embodiment of a catch assembly.

A perspective view of another illustrative embodiment of a rodless slide assembly 502 is shown in FIG. 30. This slide assembly 502 comprises a catch assembly 534 that includes an impact plate 540 extending from block 546 to engage stop block 336. This embodiment of the catch assembly 534 is intended to be a low cost alternative that is configured to engage stop block 336 in one direction of travel of carriage 506. As shown here, carriage 506 moves in direction 14 and is caused to stop upon engagement between stop block 336 and impact plate 540 at a designated point along the travel of the stroke. It can be appreciated from this configuration that catch assembly 534 is not configured to engage stop block 336 during travel of carriage 506 in direction 12. Catch assembly 534, however, can be configured to stop carriage assembly 506 in direction 12 by moving impact plate 540 to the other side of block 546 and relocating assembly 534 to the desired position along the path of movement in direction 12.

Figure 31:
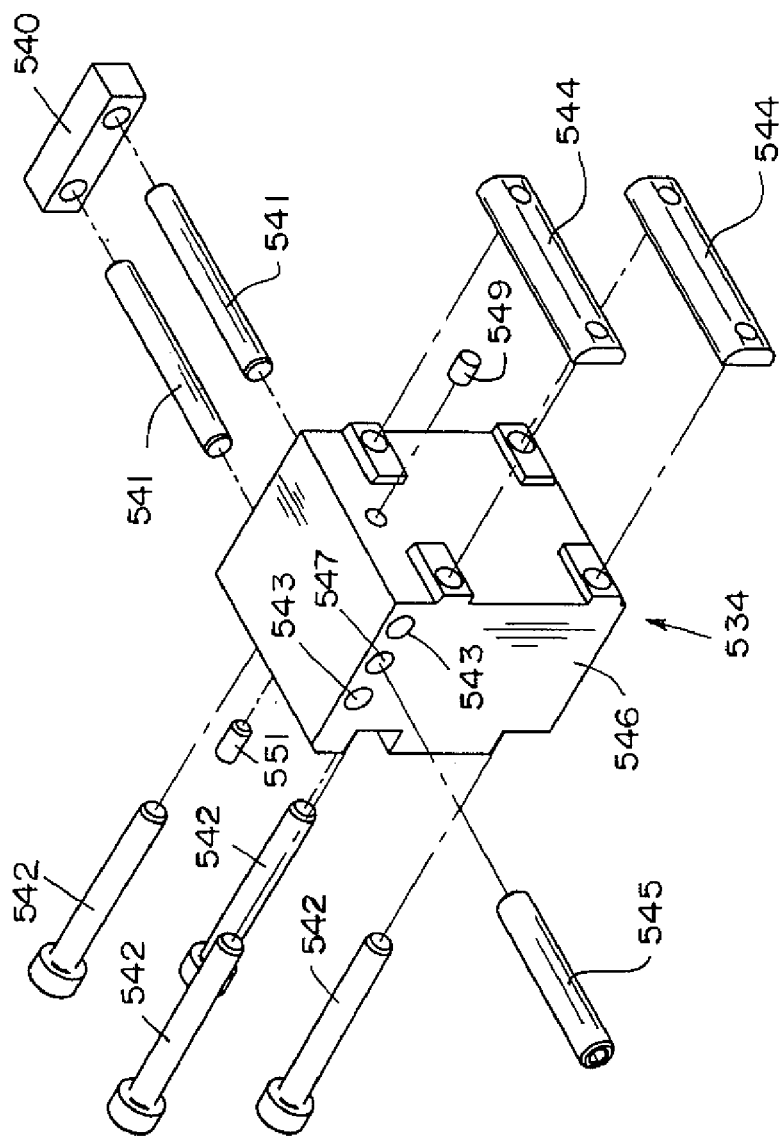
FIG. 31 is an exploded-perspective view of the catch assembly from FIG. 30.

An exploded view of catch assembly 534 is shown in FIG. 31. This view shows impact plate 540 being coupled to block 546 via dowels 541 disposed through corresponding openings 543. In this illustrative embodiment a set screw or other similar type fastener 545 can be disposed in bore 547 to engage and adjust impact plate 540. An adjustment plug 549 engages fastener 545 and provides friction on fastener 545 and dowel 541, preventing both from unintended movement. Another set screw 551 can also be disposed in block 546 to limit the movement of impact plate 540. It is appreciated that although this view shows impact plate 540 and dowels 541 being disposed on one side of block 546, bores 543 and 547 can be configured so that impact plate 540 can be disposed on the other side of block 546 from that shown in FIG. 31. This view further shows fasteners 542 that engage bars 544 which are used to secure catch assembly 534 onto slide 502, such as that illustratively shown in FIG. 30.

Although the present disclosure has been described with reference to particular means, materials and embodiments from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A rodless slide assembly comprising:
a longitudinally-extending cylinder comprising first and second ends and a path of travel extending therebetween;
a carriage slidable on the path of travel on the cylinder between the first and second ends;
a stop assembly comprising a stop block and a stabilizer;
wherein the stop assembly is coupled to the carriage;
wherein the stabilizer is located between the stop block and the carriage; and
a catch assembly comprising a catch bar and an actuator assembly;
wherein the catch bar is located adjacent the path of travel of the carriage.

2. The rodless slide assembly of claim 1, wherein the actuator assembly selectively moves the catch bar to engage the stop block and stop the carriage when the carriage is positioned at a selected location on the path of travel.

3. The rodless slide assembly of claim 1, wherein the carriage further comprises an underside and the stop block is located on the underside.

4. The rodless slide assembly of claim 1, wherein the catch bar further comprises a support portion that is spaced apart from the actuator assembly and does not impact the stop block, and is configured to absorb at least a portion of any impact force created during engagement between the catch bar and the stop block.

5. The rodless slide assembly of claim 1, wherein the stop block is movable with respect to the carriage.

6. The rodless slide assembly of claim 1, wherein the stop block is engagable with at least one shock absorber.

7. The rodless slide assembly of claim 1, further comprising a plate located between the stop block and the carriage, wherein the stabilizer further comprises at least one bias located between the plate and the stop block.

8. The rodless slide assembly of claim 7, wherein the bias comprises at least one spring and bearing, wherein the bearing engages the plate.

9. The rodless slide assembly of claim 1, wherein the catch bar is L-shaped.

10. The rodless slide assembly of claim 1, wherein the catch bar is coupled to the actuator assembly via a fastener.

11. The rodless slide assembly of claim 10, wherein the catch assembly further comprises an o-ring disposed between the fastener and the catch bar to provide stabilization of the catch bar.

12. A rodless slide assembly comprising:
a longitudinally-extending cylinder comprising first and second ends and a path of travel extending therebetween;
a carriage slidable on the path of travel on the cylinder between the first and second ends;
a stop assembly comprising a stop block;
wherein the stop assembly is coupled to the carriage; and
a catch assembly comprising an impact bar and a block;
wherein the impact bar is coupled to the block by at least one rod that engages both the impact bar and the block.

13. The rodless slide assembly of claim 12, wherein the impact bar is adjustable relative to the block by a screw that engages both.

* * * * *